(12) United States Patent
Sun et al.

(10) Patent No.: US 11,897,706 B2
(45) Date of Patent: Feb. 13, 2024

(54) ROBOTIC SYSTEM WITH ZONE-BASED CONTROL

(71) Applicant: Dexterity, Inc., Redwood City, CA (US)

(72) Inventors: Zhouwen Sun, Redwood City, CA (US); Cuthbert Sun, Cupertino, CA (US); Andrew Nguyen, Redwood City, CA (US); Samuel Tay, Sunnyvale, CA (US); Emilie Peck, Palo Alto, CA (US); Kevin Jose Chavez, Redwood City, CA (US); Robert Holmberg, Mountain View, CA (US)

(73) Assignee: Dexterity, Inc., Redwood City, CA (US)

( * ) Notice: Subject to any disclaimer, the term of this patent is extended or adjusted under 35 U.S.C. 154(b) by 239 days.

(21) Appl. No.: 17/217,467

(22) Filed: Mar. 30, 2021

(65) Prior Publication Data

US 2022/0315354 A1    Oct. 6, 2022

(51) Int. Cl.
*B25J 13/08* (2006.01)
*B25J 19/02* (2006.01)
(Continued)

(52) U.S. Cl.
CPC .......... *B65G 47/905* (2013.01); *B25J 9/1651* (2013.01); *B25J 9/1661* (2013.01); *B25J 9/1666* (2013.01);
(Continued)

(58) Field of Classification Search
CPC ...... B25J 9/1651; B25J 9/1661; B25J 9/1666; B25J 9/1676; B25J 9/1679; B25J 9/1697; B25J 13/089; B25J 5/02; B25J 9/0084; B25J 9/1633; B25J 9/1687; B25J 19/06; B25J 19/02; B65G 2203/0283; B65G 2203/041; B65G 47/905; B65G 1/1378; B65G 61/00; B65G 2207/40; F16P 3/144; F16P 3/08; F16P 3/142; F16P 3/147; G05B 2219/39529; G05B 2219/40032
See application file for complete search history.

(56) References Cited

U.S. PATENT DOCUMENTS

| 4,570,798 A | 2/1986 | Wilson |
| 5,120,190 A | 6/1992 | Smith |

(Continued)

FOREIGN PATENT DOCUMENTS

WO    2020250166    12/2020

*Primary Examiner* — Adam R Mott
*Assistant Examiner* — Heather J Keniry
(74) *Attorney, Agent, or Firm* — Van Pelt, Yi & James LLP

(57) ABSTRACT

A robotic line kitting system is disclosed. Data indicating for each of a plurality of operating zones comprising a workspace with which the robotic line kitting system is associated a corresponding safety state information is stored. The data is used to dynamically schedule and perform tasks associated with a higher level objective, including by operating the one or more robotic instrumentalities in one or more operating zones, if any, indicated by the data to currently be available to perform tasks using the one or more robotic instrumentalities and by not operating the one or more robotic instrumentalities in one or more operating zones, if any, indicated by the data to not currently be available to perform tasks using the one or more robotic instrumentalities.

20 Claims, 14 Drawing Sheets

(51) Int. Cl.

| | |
|---|---|
| *B25J 19/06* | (2006.01) |
| *B25J 5/02* | (2006.01) |
| *B25J 9/00* | (2006.01) |
| *B25J 9/16* | (2006.01) |
| *B65G 1/137* | (2006.01) |
| *B65G 47/90* | (2006.01) |
| *B65G 61/00* | (2006.01) |
| *F16P 3/08* | (2006.01) |
| *F16P 3/14* | (2006.01) |

(52) U.S. Cl.
CPC ........... *B25J 9/1676* (2013.01); *B25J 9/1679* (2013.01); *B25J 9/1697* (2013.01); *B25J 13/089* (2013.01); *B65G 2203/0283* (2013.01); *B65G 2203/041* (2013.01)

(56) References Cited

U.S. PATENT DOCUMENTS

| | | |
|---|---|---|
| 10,503,143 B1 | 12/2019 | Polic |
| 10,549,928 B1 | 2/2020 | Chavez |
| 10,981,272 B1 | 4/2021 | Nagarajan |
| 2006/0276934 A1 | 12/2006 | Nihei |
| 2009/0069943 A1 | 3/2009 | Akashi |
| 2014/0330433 A1 | 11/2014 | Ciarelli |
| 2015/0032252 A1 | 1/2015 | Galluzzo |
| 2015/0112483 A1 | 4/2015 | Mougin |
| 2015/0294483 A1 | 10/2015 | Wells |
| 2016/0089790 A1 | 3/2016 | Wang |
| 2016/0224012 A1 | 8/2016 | Hunt |
| 2017/0210017 A1 | 7/2017 | Yamamoto |
| 2017/0269607 A1 | 9/2017 | Fulop |
| 2018/0056479 A1 | 3/2018 | Hu |
| 2018/0134492 A1 | 5/2018 | Lert, Jr. |
| 2018/0215544 A1 | 8/2018 | High |
| 2018/0243920 A1* | 8/2018 | Hashimoto ............... B25J 3/00 |
| 2019/0176323 A1 | 6/2019 | Coady |
| 2019/0291275 A1 | 9/2019 | Szarski |
| 2019/0339693 A1* | 11/2019 | Menon ............... G05D 1/0061 |
| 2019/0389659 A1 | 12/2019 | Grinnell |
| 2020/0001460 A1 | 1/2020 | Sato |
| 2020/0033865 A1 | 1/2020 | Mellinger, III |
| 2020/0047349 A1 | 2/2020 | Sinnet |
| 2020/0086482 A1 | 3/2020 | Johnson |
| 2020/0089237 A1* | 3/2020 | Whitaker ............ G05D 1/0274 |
| 2020/0095001 A1* | 3/2020 | Menon ................ B25J 9/1687 |
| 2020/0121125 A1 | 4/2020 | Zito |
| 2020/0164531 A1 | 5/2020 | Wagner |
| 2020/0206928 A1 | 7/2020 | Denenberg |
| 2020/0242544 A1* | 7/2020 | Galluzzo ............ G05D 1/0088 |
| 2020/0269429 A1* | 8/2020 | Chavez ............... B25J 15/0052 |
| 2020/0290210 A1 | 9/2020 | Ha |
| 2020/0301725 A1 | 9/2020 | Shaw |
| 2020/0331709 A1 | 10/2020 | Huang |
| 2021/0060771 A1 | 3/2021 | Gaydarov |
| 2021/0205994 A1* | 7/2021 | Dai .................. G05B 19/41815 |
| 2021/0243967 A1* | 8/2021 | Bartrom ............... B25J 9/1697 |
| 2021/0298851 A1* | 9/2021 | Huang ................... A61B 34/37 |
| 2022/0089237 A1* | 3/2022 | Sverdlov .......... G05B 19/41895 |
| 2022/0195752 A1 | 6/2022 | Fischer |
| 2023/0256605 A1 | 8/2023 | Ning |

* cited by examiner

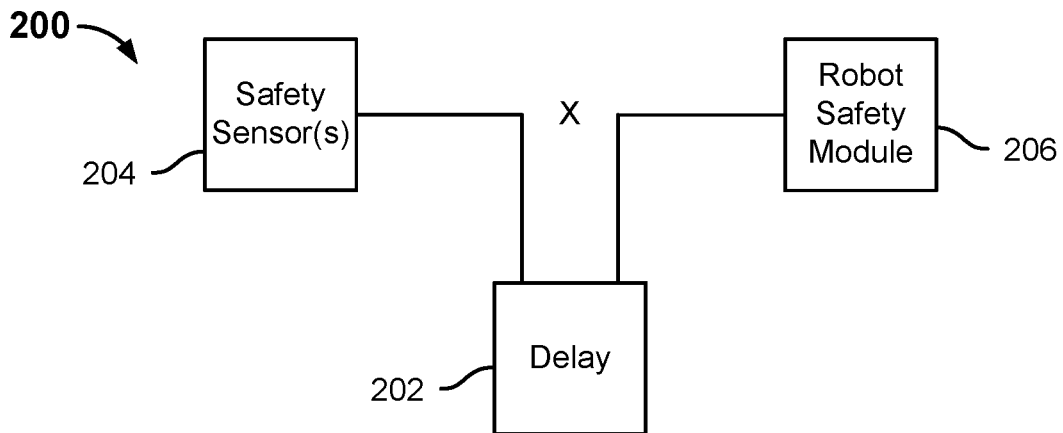
FIG. 2A
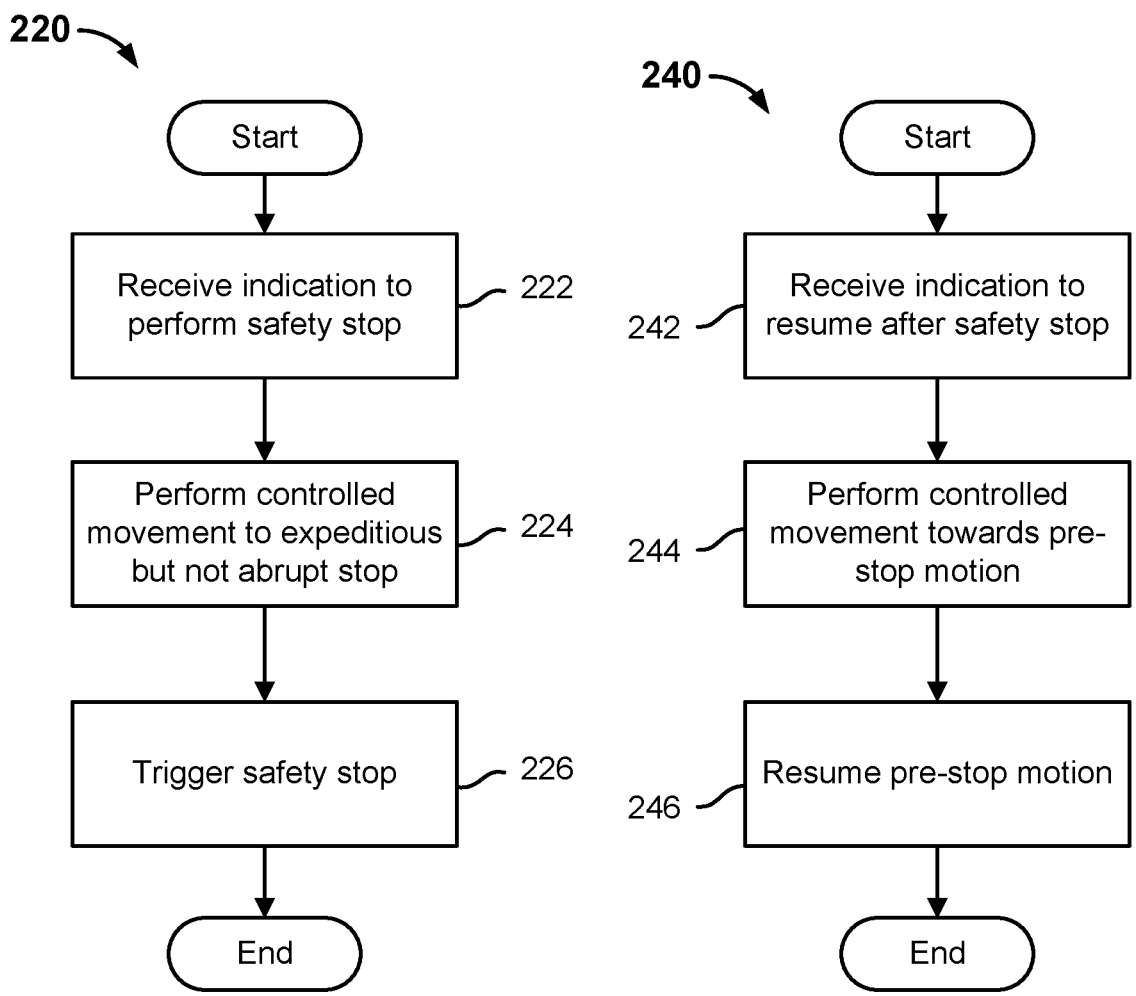
FIG. 2B
FIG. 2C

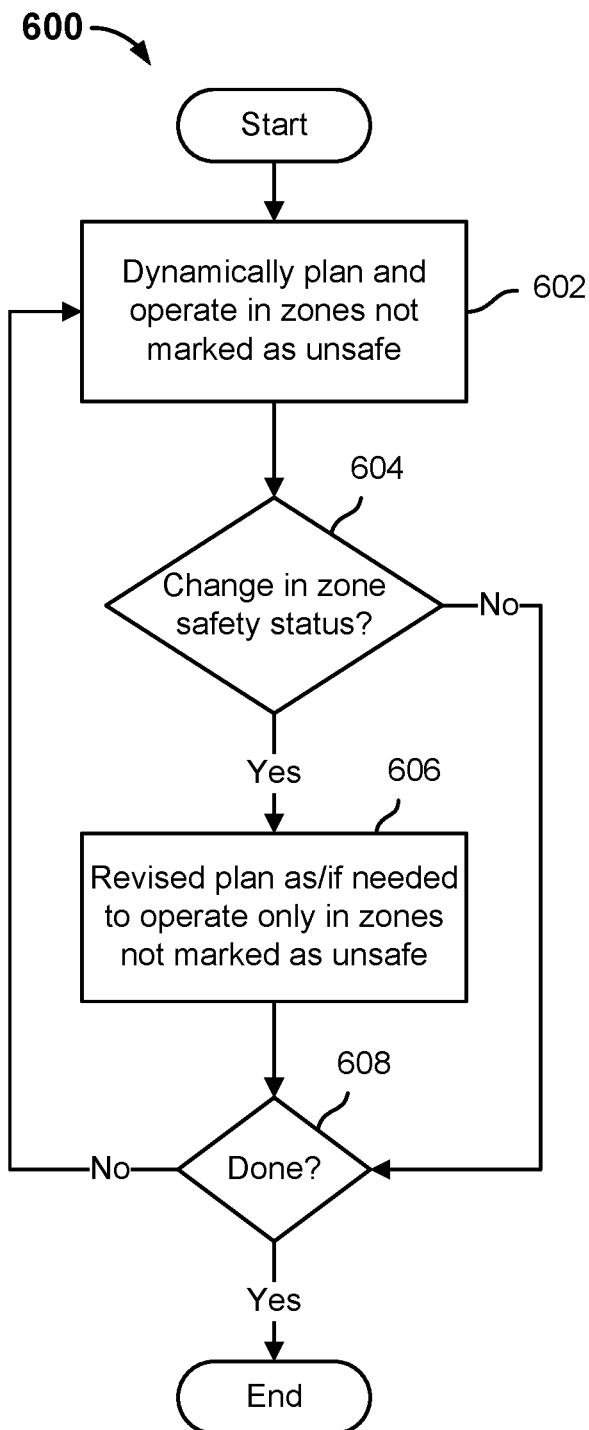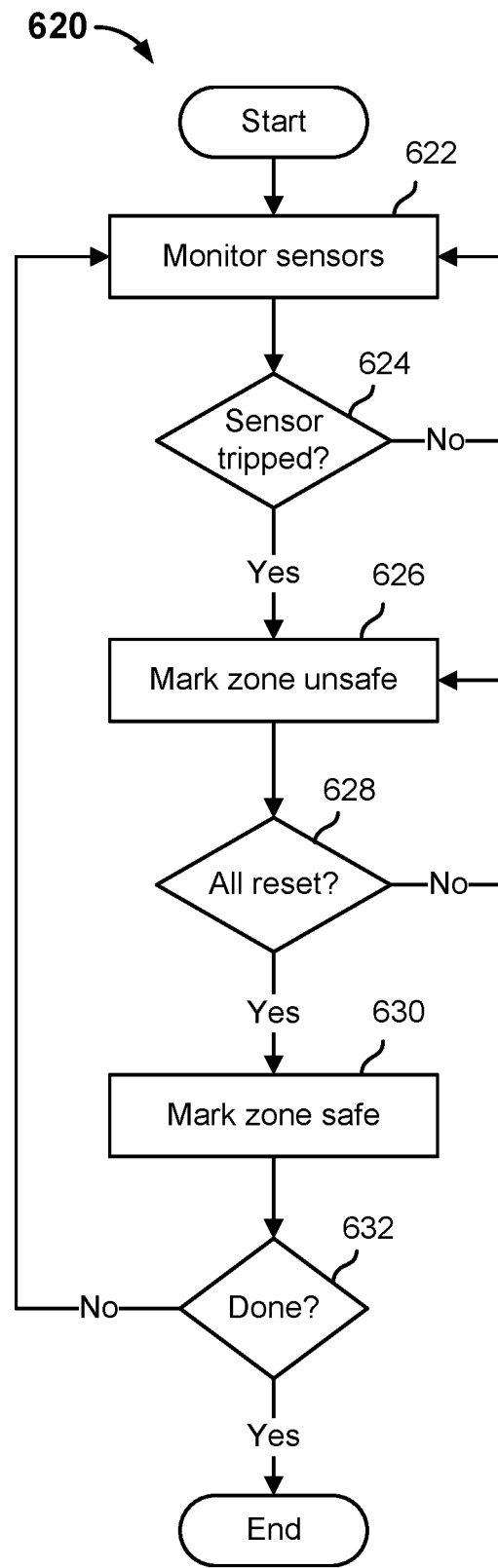
FIG. 6A
FIG. 6B

ROBOTIC SYSTEM WITH ZONE-BASED CONTROL

BACKGROUND OF THE INVENTION

Robotic line kitting (sometimes referred to as "fulfillment") systems are used to assemble items or sets of items according to a set of requirement data, such as a set of orders. For example, items may be pulled from source receptacles or stacks of receptacles in an input area and used to fulfill orders, such as by filling or stacking receptacles of items on an output area. A robotic line kitting system at a distribution center for a bakery, for example, may receive in an input buffer area homogeneous stacks of trays, each tray containing a quantity of the same baked good item. The robotic line kitting system may pick items from source trays in the input area and fill trays in the output area according to orders associated with downstream destinations, such as retail stores. Or, the robotic line kitting system may create output stacks of trays, according to orders, by picking entire trays of items from homogeneous stacks in the input area and building output stacks that may or may not be homogeneous.

Human workers may need to work near or in the same workspace as a robotic line kitting system. For example, humans may load stacks of receptacles into the input area described above and/or may be needed to remove output stacks from the output area, once assembled. A typical approach to ensuring the safety of human workers is to provide mechanisms to detect the presence of human workers and rapidly bring robotic operations to a halt. Periods of non-operation may reduce robot productivity and throughput.

BRIEF DESCRIPTION OF THE DRAWINGS

Various embodiments of the invention are disclosed in the following detailed description and the accompanying drawings.

FIG. 2A is a block diagram illustrating an embodiment of a modified safety circuit in a robotic line kitting system.

FIG. 2B is a flow diagram illustrating an embodiment of a safety stop process in an embodiment of a robotic line kitting system.

FIG. 2C is a flow diagram illustrating an embodiment of a process to restart after safety stop in an embodiment of a robotic line kitting system.

FIG. 6A is a flow diagram illustrating an embodiment of a process to plan and dynamically update planning in a robotic line kitting system having a plurality of distinct operating zones.

FIG. 6B is a flow diagram illustrating an embodiment of a process to monitor and track operating zone safety state in a robotic line kitting system having a plurality of distinct operating zones.

DETAILED DESCRIPTION

Figure 1A:
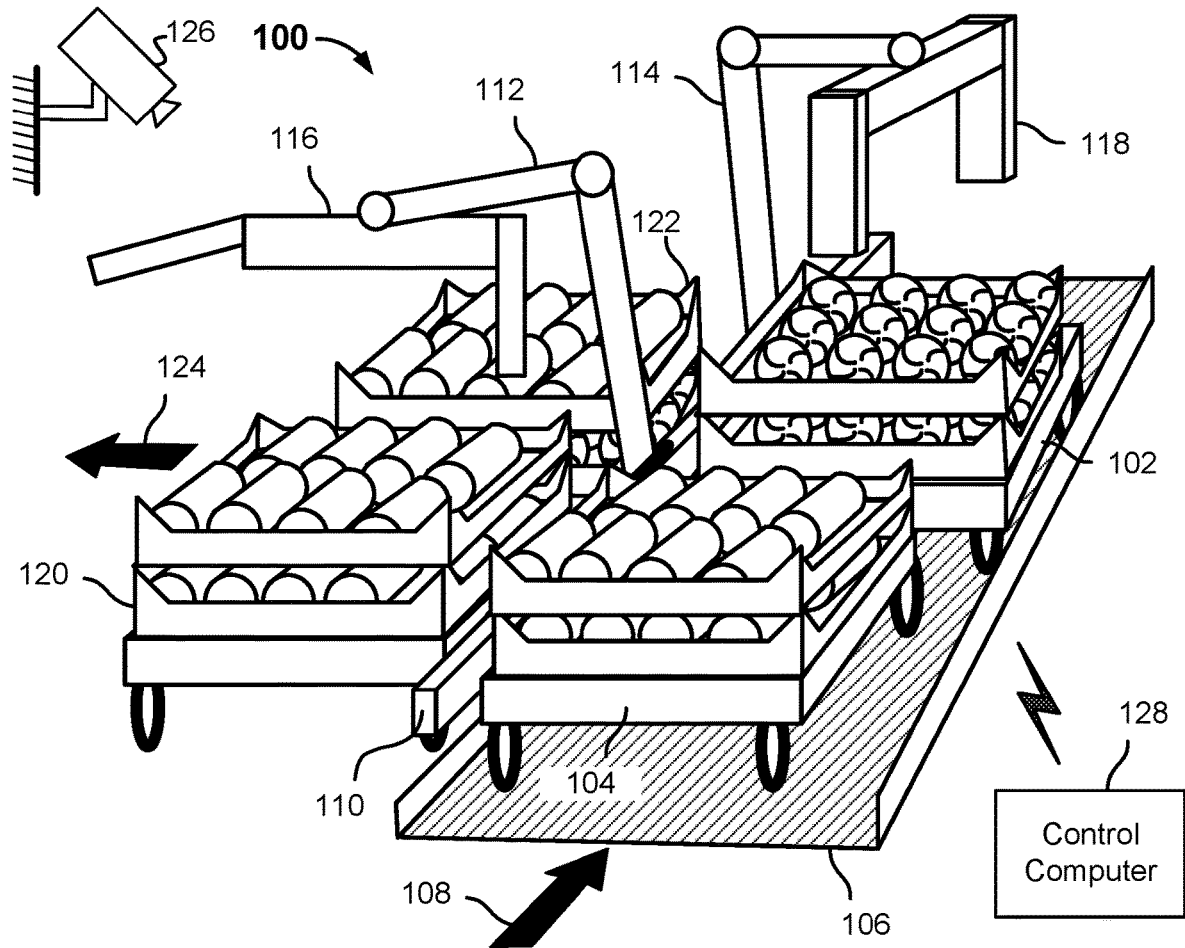
FIG. 1A is a block diagram illustrating an embodiment of a robotic line kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to enable human workers and autonomous robots to operate safely in a same or temporally shared environment. In various embodiments, a robotic line kitting system operates in a workspace divided into a plurality of operating zones. One or more zones may include safety features to ensure humans are not operating in a same space at the same time as an autonomous robot, or to ensure that to the extent humans and autonomous robots are operating in the same space at the same time the robot operates in a manner that is safe or relatively safer for the human.

In various embodiments, a robotic line kitting system as disclosed herein operates in a fully autonomous mode. A set of high-level objectives, such as a set of orders to be fulfilled, is received. State information is received, such as input date indicating the number and types of items expected to be provided to an input buffer area and/or structure of the system, and other state information is generated by sensors, such as cameras and computer vision systems configured to detect the location, orientation, and contents of input and output stacks and/or receptacles. A hierarchical planner/scheduler coordinates work by a set of one or more robotic instrumentalities, e.g., robotic arms, robotically controlled conveyers, and/or other robots, to perform tasks associated with accomplishing a subobjective of the overall, high-level objective.

In various embodiments, each of one or more zones comprising a workspace in which a robotic system is operating, such as a robotic line kitting system, as disclosed herein includes one or more structured designed and configured to maintain separation between human workers and autonomous robotic instrumentalities, in at least one mode of autonomous operation. One or more safety sensors are provided to a change in state, e.g., opening of a gate, entry of a human worker into an operating zone, etc. Upon detecting actual or potential entry by a human into a zone, in various embodiments a robotic line kitting system as disclosed herein alters the autonomous behavior of one or more robotic instrumentalities to ensure safety of any human worker in the operating zone.

In some embodiments, upon detecting a condition in which a human is or may be present in an operating zone, a robotic system as disclosed herein dynamically updates its plan/schedule, as necessary, to continuing performing tasks autonomously in a manner that ensures safety. For example, in some embodiments, a robotic system as disclosed herein may dynamically replan its work to operate autonomously in zones in which no condition associated with human presence currently is or has been detected. The robotic system in various embodiments may avoid having robots work autonomously in zones in which a human may be present or may operate in or near such zones in a manner considered safe or safer under the detected condition, such as by operating more slowly, using less force, emitting an audible and/or visual warning, etc.

In various embodiments, a robotic system as disclosed herein, upon detecting an unsafe or potentially unsafe condition, a robotic instrumentality, such as a robotic arm, that has an item or receptacle full of items in its grasp performs or if conditions permit may perform a modified safety stop. In a first phase the system slows its rate of motion in an expeditious but controlled manner to reduce to a reduced rate of motion and (only) then triggers a safety stop feature of the robotic instrumentality. In this manner, the robot is less likely to lose its grasp of the item, cause an item to be ejected from a receptacle in its grasp, or cause damage to a fragile item in its grasp. In some embodiments, a timeout for an operation the robot was being used to perform may be suspended or extended. Once the condition is clear, the robot may resume operation in a two-step manner, first gradually increasing speed to a target rate of motion and then switching to full operating speed.

FIG. 1A is a block diagram illustrating an embodiment of a robotic line kitting system. In the example shown, system 100 includes source tray stacks 102, 104 moving along an input stack conveyance 106 fed in this example from an input end (staging and loading area) 108. Each of the source tray stacks 102, 104 in this example is shown to be stacked on a wheeled cart or chassis. In various embodiments, the tray stacks 102, 104 may be pushed manually onto the conveyance 106, which may be a conveyor belt or other structure configured to advance the source tray stacks 102, 104 through the workspace defined by conveyance 106. In some embodiments, the chassis or other base structure on which the source trays are stacked may be self-propelled. In some embodiments, source tray stacks 102, 104 may be advanced through/by conveyance 106 under robotic control. For example, the speed and times at which the source tray stacks 102, 104 are advanced by/through conveyance 106 may be controlled to facilitate efficient grasping of trays from the source tray stacks 102, 104.

In the example shown, a single rail 110 is disposed along one long side of the conveyance 106. In this example, two robots, one comprising robotic arm 112 and another comprising robotic arm 114, are mounted movably, independent of one another, on rail 110. For example, each robotic arm 112, 114 may be mounted on a self-propelled chassis that rides along rail 110. In this example, each robotic arm 112, 114 terminates with a tray handling end effector 116, 118. In various embodiments, the tray handling end effector 116, 118 is operated under robotic control to grasp one or more trays from a source tray stack 102, 104. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member).

In various embodiments, each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays.

In various embodiments, each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

In various embodiments, the respective robots 112, 114 are operated at the same time, fully autonomously, to pick trays from source tray stacks 102, 104 and place them on destination tray stacks, such as stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments, one of more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors 116, 118. In various embodiments, the robotic elements are controlled by control computer 128 based on input data, such invoice, order, and/or manifest information, as well as input state information, such inventory data indicating which source tray stacks include which type and/or quantity of product.

In various embodiments, source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/ and weight distribution. The system 100 uses force control to operate robotic arms 112, 114 to insert a thumb or other protrusion gently and securely into a tray and plans its motion and tray trajectory in order to not collide with itself or the environment. In various embodiments, each robot 112, 114 operates in a very tight space of roughly 2.5 m in width and has a very light footprint. The robot utilizes its full workspace and intelligently plans its motion optimizing its grasp. It recognizes the need to perform orientation changes and handles that accordingly while avoiding obstacles. The robot moves to the correct output (destination stack 120, 122) corresponding to the right customer while coordinating with the other robots on the rail 110. It then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

While a single camera 126 mounted to a wall in the workspace of system 100 is shown in FIG. 1A, in various embodiments, multiple cameras may be mounted statically in a workspace. In addition, or instead, one or more cameras may be mounted on or near each robotic arm 112, 114, such as on the arm itself and/or on the end effector 116, 118, and/or on a structure that travels with the robotic arm 112, 114 as it is moved along rail 110.

Figure 1B:
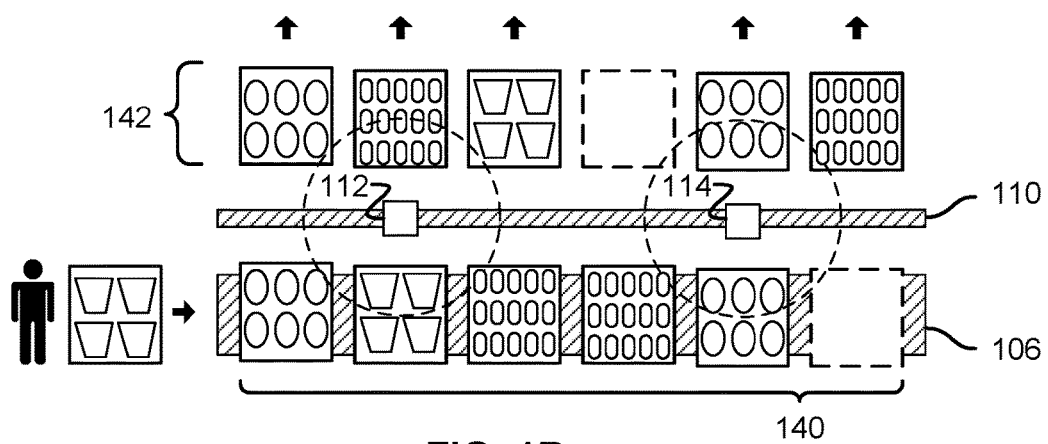
FIG. 1B is a block diagram illustrating an embodiment of a robotic line kitting system.

FIG. 1B is a block diagram illustrating an embodiment of a robotic line kitting system. In FIG. 1B, an example is shown of an overhead view of a workspace in which the system 100 of FIG. 1A may operate. In the example shown, robotic arms 112, 114 move along a common rail 110, as in FIG. 1A, to access and pick trays from source stacks 140 moving along conveyor 106 and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of item in other embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

While in the example shown in FIGS. 1A and 1B a robotic line kitting system handles trays of items, picking trays from input stacks in or passed through an input buffer area and constructing output stacks in an output area, in various embodiments techniques disclosed herein are used in other contexts, such in robotic kitting or fulfillment systems in which individual items are handled, as opposed to trays of items, and/or in which orders are fulfilled other than by creating output stacks of trays or other receptacles, such as by filling boxes, trays, bins, or other receptacles.

FIG. 2A is a block diagram illustrating an embodiment of a modified safety circuit in a robotic line kitting system. In various embodiments, a modified safety circuit 200 as shown in FIG. 2A may be used in the context of a robotic kitting system, e.g., as shown in FIGS. 1A and 1B. In some embodiments, the modified safety circuit 200 may be implemented in and/or associated with an autonomously operated robotic instrumentality, such as one or more of robotic arms 112 and 114 and conveyor 106 of FIGS. 1A and 1B. In the example shown, modified safety circuit 200 includes a delay 202 interposed in a signal path between one or more safety sensors 204 and a robot safety module 206. One or more of the delay 202, safety sensor(s) 204, and robot safety module 206 may be embodied on or in a chassis or other structure comprising the robotic instrumentality. Examples of safety sensor(s) 204 include, without limitation, one or more of a force sensor, a touch sensor, a contact sensors, a pressure sensor, a light curtain, an infrared or other electro-optical and/or radio frequency sensor, computer vision or other camera or vision based sensors, or any other sensor.

In various embodiments, interposing the delay 202 in the signal path between the safety sensor(s) 204 and the robot safety module 206 affords a robotic system as disclosed herein an opportunity to perform an initial phase of a controlled safety stop, in which a rate of motion of the robotic instrumentality is or depending on the circumstances may be reduced in an expeditious but not overly abrupt manner to a target rate of motion prior to a safety stop being triggered and/or performed by the robot safety module 206. In some embodiments, the two-step approach disclosed herein reduces the risk that an item in the grasp of the robotic instrumentality, e.g., an item in a grasp of an end effector such as end efforts 116, 118 of robotic arms 112, 114 or a stack of items on conveyor 106, in the system 100 of FIGS. 1A and 1B, will be dropped or damaged due to the robot safety module 206 causing the robot to stop too abruptly.

In various embodiments, the delay 202 may be bypassed or be a short duration if a more urgently unsafe condition is detected, such as confirmed presence of a human in a work area with the robot, contact or close proximity between a human and the robot, etc. In some embodiments, the length of the delay imposed by delay 202 may be varied. For example, in some embodiments the delay may be proportional to a current rate of motion of the robot (e.g., the end effector). If the robot is moving more quickly, the delay may be longer to allow a controlled decrease in the rate of motion before the robot safety module 206 triggers a safety stop. In some embodiments, the delay 202 may be bypassed under circumstances in which no harm is likely to result from the robot being stopped abruptly, such as if the robot does not currently have an item in its grasp.

In various embodiments, delay 202 may be implemented in hardware, e.g., such as one or more circuit elements; in software, e.g., as a combination of delay logic and a timer; or both.

FIG. 2B is a flow diagram illustrating an embodiment of a safety stop process in an embodiment of a robotic line kitting system. In various embodiments, the process 220 of FIG. 2B is performed by a control computer, such as control computer 128. For example, the process 220 may be performed by a safety module comprising a robot controller running on a control computer. In the example shown, at 222, an indication is received to perform a safety stop. For example, a signal may be received directly or indirectly from a sensor, such as safety sensor(s) 204, indicating a potentially unsafe condition. At 224, a controlled movement towards an expeditious but not abrupt start is performed. For example, the robot may be commanded to reduce speed at a determined rate or to a target speed over a prescribed or determined interval. At 226, a safety stop is triggered. For example, a previously delayed signal from a safety sensor, such as safety sensor(s) 204, may be provided to a safety module of the robot, such as safety module 206, to trigger a safety stop.

FIG. 2C is a flow diagram illustrating an embodiment of a process to restart after safety stop in an embodiment of a robotic line kitting system. In various embodiments, the process 240 of FIG. 2C may be performed to resume operation, e.g., when a robot has been stopped mid-task due to a detected condition, as in process 220 of FIG. 2B. In the example shown, at 242, an indication is received to resume operation after a safety stop. For example, an indication may be received that a safety condition that prompted the robot to be stopped has been resolved or cleared. At 244, rather than prompting the robot to resume operation at the full operational speed at which it may have been running prior to the safety stop, a movement increase speed in a controlled but expeditious manner is performed. For example, the robot's speed may be increased at a controlled rate to a target speed less than the full operational speed at which the robot was moving at the time the safety stop was initiated. At 246, the robot resumes operating at full operational speed, e.g., ramping up quickly to the speed at which it was operating prior to the safety stop.

Figure 3A:
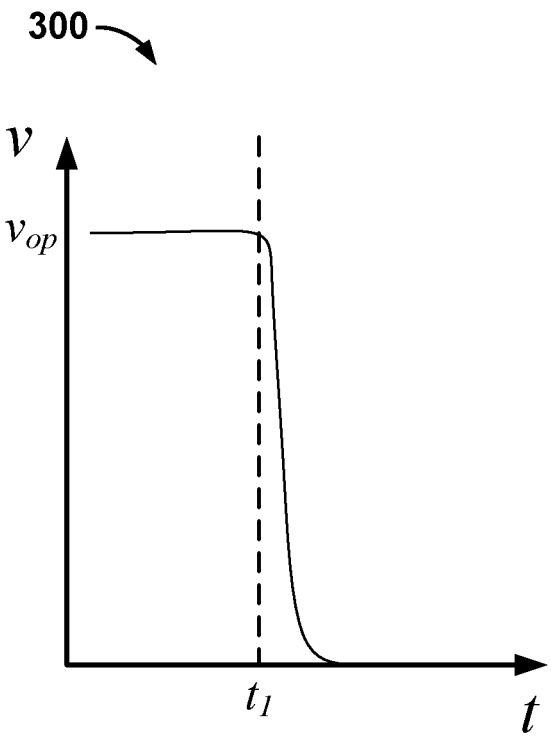
FIG. 3A is a diagram illustrating an example of a safety stop in an embodiment of a robotic line kitting system.

FIG. 3A is a diagram illustrating an example of a safety stop in an embodiment of a robotic line kitting system. The graph 300 illustrates the rapid change in speed that could occur in the event a safety stop is triggered and the two-step safety stop described above in connection with FIG. 2B were not employed. In the example shown, the speed decreases very abruptly at the time t1 from an operational speed Vop to a full stop when the safety condition was detected, potentially resulting in the robot dropping or damaging an item in its grasp.

Figure 3B:
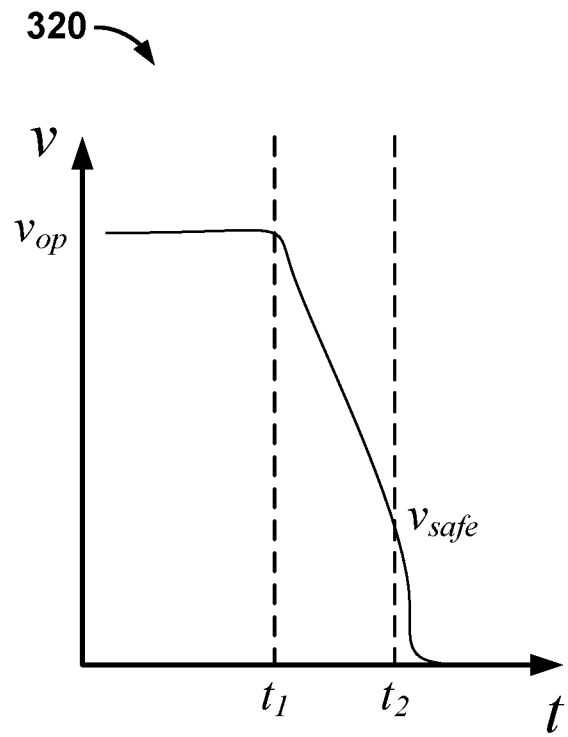
FIG. 3B is a diagram illustrating an example of a modified safety stop in an embodiment of a robotic line kitting system.

FIG. 3B is a diagram illustrating an example of a modified safety stop in an embodiment of a robotic line kitting system. In the example shown, the graph 320 illustrates a two-step safety stop, e.g., as described above in connection with FIG. 2B. In the example shown, upon receiving an indication at time t1 to perform a safety stop, the system executes a controlled deceleration from operating speed Vop to achieve target speed Vsafe by time t2, at which time a safety stop is triggered result in the speed rapidly being reduced to zero.

Figure 3C:
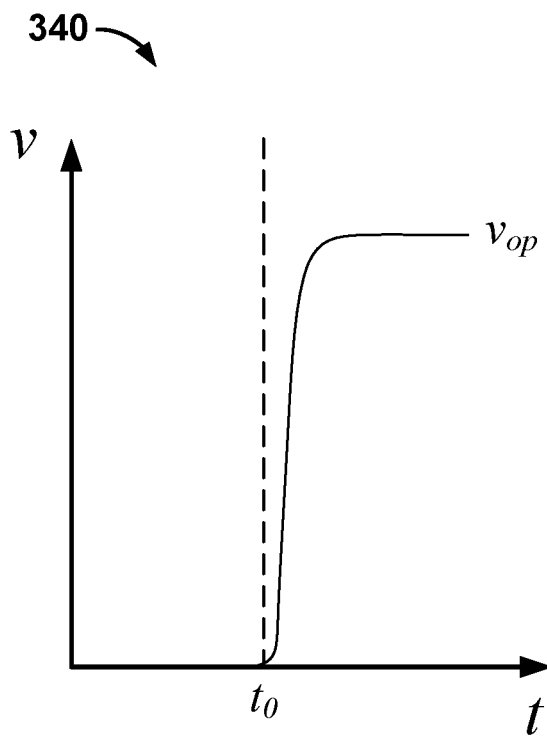
FIG. 3C is a diagram illustrating an example of a restart after safety stop in an embodiment of a robotic line kitting system.

FIG. 3C is a diagram illustrating an example of a restart after safety stop in an embodiment of a robotic line kitting system. Graph 340 illustrates a safety stop performed in the traditional manner, instead of using the two-step process of FIG. 2C. In the example shown, the robot abruptly goes from stopped to full operational speed Vop at time t0, potentially resulting in the robot dropping or damaging an item in its grasp.

Figure 3D:
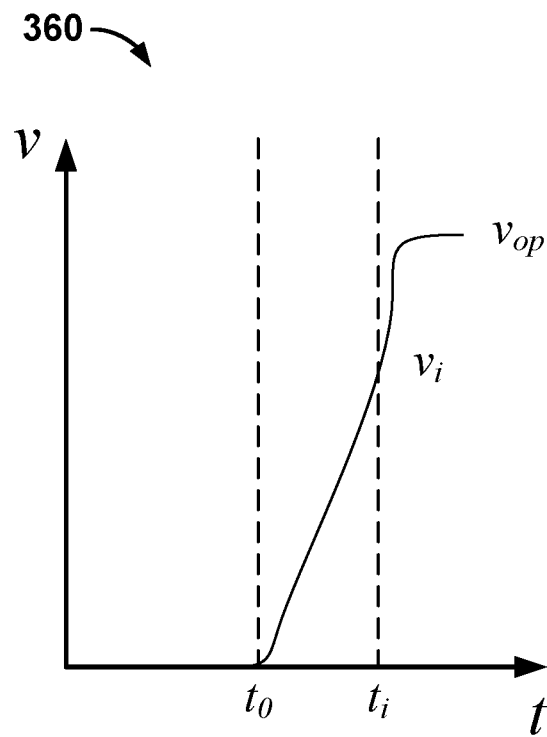
FIG. 3D is a diagram illustrating an example of a modified restart after safety stop in an embodiment of a robotic line kitting system.

FIG. 3D is a diagram illustrating an example of a modified restart after safety stop in an embodiment of a robotic line kitting system. Graph 360 illustrates a two-step process to resume operation after a safety stop, as in the process 240 of FIG. 2C. In the example shown, upon receiving an indication at time t0 to resume operation, the speed is increased in a controlled manner to achieve an initial speed Vi by time ti, at which time the robot is signaled to resume operation at full speed, resulting in the robot rapidly ramping up to the speed Vop at which it was operating immediately before the safety stop.

Figure 4:
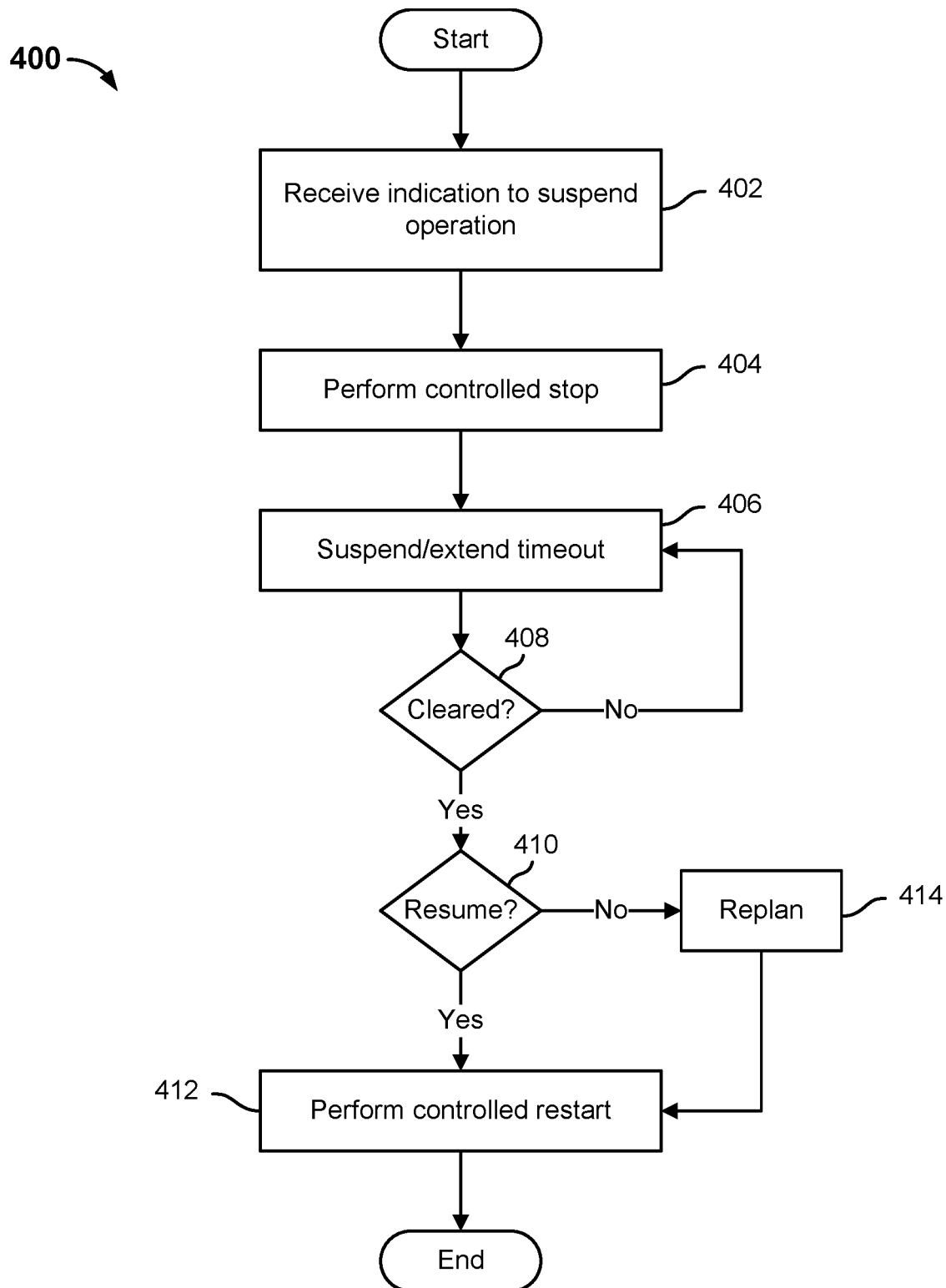
FIG. 4 is a flow diagram illustrating an embodiment of a process to stop and restart in response to detection and clearance of an unsafe condition in an embodiment of a robotic line kitting system.

FIG. 4 is a flow diagram illustrating an embodiment of a process to stop and restart in response to detection and clearance of an unsafe condition in an embodiment of a robotic line kitting system. In various embodiments, the process 400 is performed by a computer, such as control computer 128 of FIG. 1A. In the example shown, at 402, an indication is received to suspend a task or operation. For example, a safety sensor may have been triggered. At 404, a controlled stop is performed. For example, a two-step safety stop, such as described above in connection with FIG. 2B, may be performed. In some embodiments, the controlled stop at 404 may be performed in a manner determined based at least in part on a level and/or immediacy of the condition detected. For example, detection of a condition in which a robot may imminently come into contact with a human may result in a full emergency stop in a single stage, as illustrated in FIG. 3A. By contrast, detection that a gate has been opened combined with a determination that a light curtain or other sensor just inside the gate has not (yet) been triggered, suggesting a human has not yet entered the operating area, may instead result in a two-step safety stop, as illustrated by FIGS. 2B and 3B.

At 406, a timeout associated with a task or operation the robot was in the midst of performing when indication was received at 402 and/or the controlled stop was performed at 404 is suspended or extended. In various embodiments, suspending or extending the timeout may enable the operation the robot was performing when stopped at 404 to be resumed and completed, which may be more efficient for the overall system than having the operation be aborted due to timing out.

At 408, it is determined whether an indication to resume the suspended operation has been received. If not, the timeout may be extended or suspended further at 406. In some embodiments, if after a prescribed interval the condition that resulted in the stop at 404 has not been cleared the timeout suspended at 406 is allowed to resume and, if enough time passes, expire (not shown in FIG. 4), enabling the system to move on to use other resources (e.g., other robots) to complete the operation.

Once the condition that resulted in the stop has cleared (408), a determination is made at 410 as to whether the operation in progress when the robot was stopped at 404 should be aborted or resumed. For example, if the robotic system has not moved on to use other resources to complete the operation that was interrupted and the state of the workspace is such that the operation can be resumed, then at 412 a controlled restart of the robot is performed (e.g., as illustrated in FIGS. 2C and 3D) and the operation is resumed and performed to completion. For example, if the robot was in the process of moving a tray to a destination location at which the robot was to place the tray on a corresponding destination stack, at 412 the operation may be resumed if the destination stack remains in a destination stack output area and still needs the tray in the robot's grasp to be added to it. If at 410 it is determined the suspended task or operation should not or cannot be resumed, a dynamic replanning is performed at 414 to determine a next task for the robot and at 412 a controlled restart is performed. In some embodiments, the robot may abort the suspended task, e.g., by returning a tray or item in its grasp to an input buffer area from which it was picked and/or placing it in a separate buffer area for exception handling, prior to moving on to a next task according to the plan determined/revised dynamically at 414.

Figure 5A:
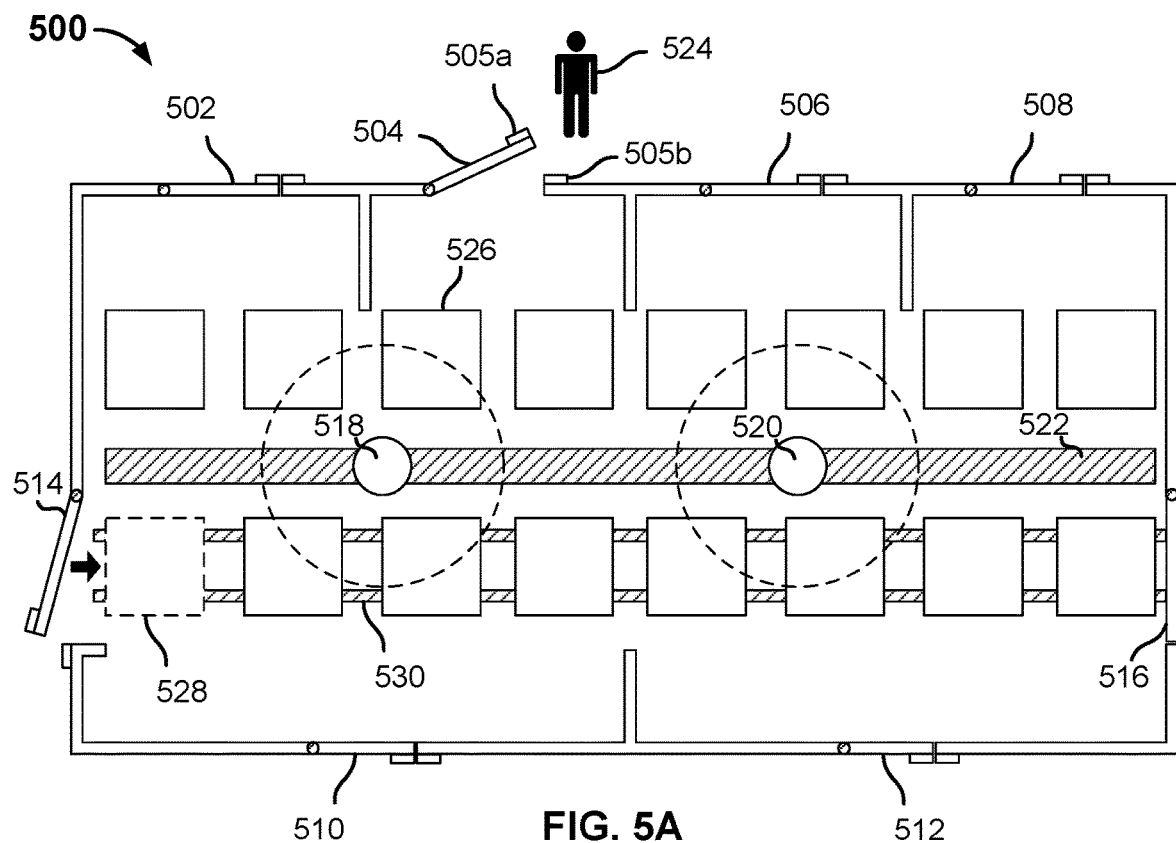
FIG. 5A is a diagram illustrating an embodiment of a robotic line kitting system having a plurality of distinct operating zones.

FIG. 5A is a diagram illustrating an embodiment of a robotic line kitting system having a plurality of distinct operating zones. In various embodiments, the system 500 may be included in a robotic line kitting system, such as system 100 of FIG. 1A, and perform line kitting autonomously under control of a computer, such as control computer 128 of FIG. 1A. In the example shown, system 500 comprises line kitting robotic instrumentalities and workspaces contained and configured to operate within a plurality of distinct zones. A series of gates and partitions (e.g., walls, fences, or other barriers) define distinct operating areas, including in this example distinct areas accessible (e.g., by a human) via gates 502, 504, 506, 508, 510, and 512. For example, gates 502, 504, 506, and 508 each may be used to access a corresponding defined and distinct operating area of the system 500.

In the example shown, an ingress gate 514 provides access to move a stack of trays or other receptacles into an ingress position of an input buffer used to provide input stacks from which trays or other receptacles are picked by robots 518 and 520 operating on rail 522 to build output stacks of trays or other receptacles in the respective operation areas corresponding to gates 502, 504, 506, and 508. In the example shown, a human worker 524 has opened gate 504, e.g., to perform a task, such as removing a completed output stack 526 from the operating area corresponding to gate 504. The gate may be detected to have been opened due to a loss of signal (or a signal being generated) by virtue of sensor component 505a having been moved out of contact and/or proximity with sensor component 505b. In the example shown, gate 514 has been opened, e.g., by a different human worker (not shown), to perform a task, such as moving an input stack of trays or other receptacles into the currently empty ingress position 528 on stack conveyor 530. Other conditions not illustrated in FIG. 5A may require gate 510 or gate 512 to be opened, e.g., to access the corresponding operating area to resolve a problem with an input stack, such as errantly stacked trays, a tray having items other than the system expected, a dropped tray or item, etc.

Figure 5B:
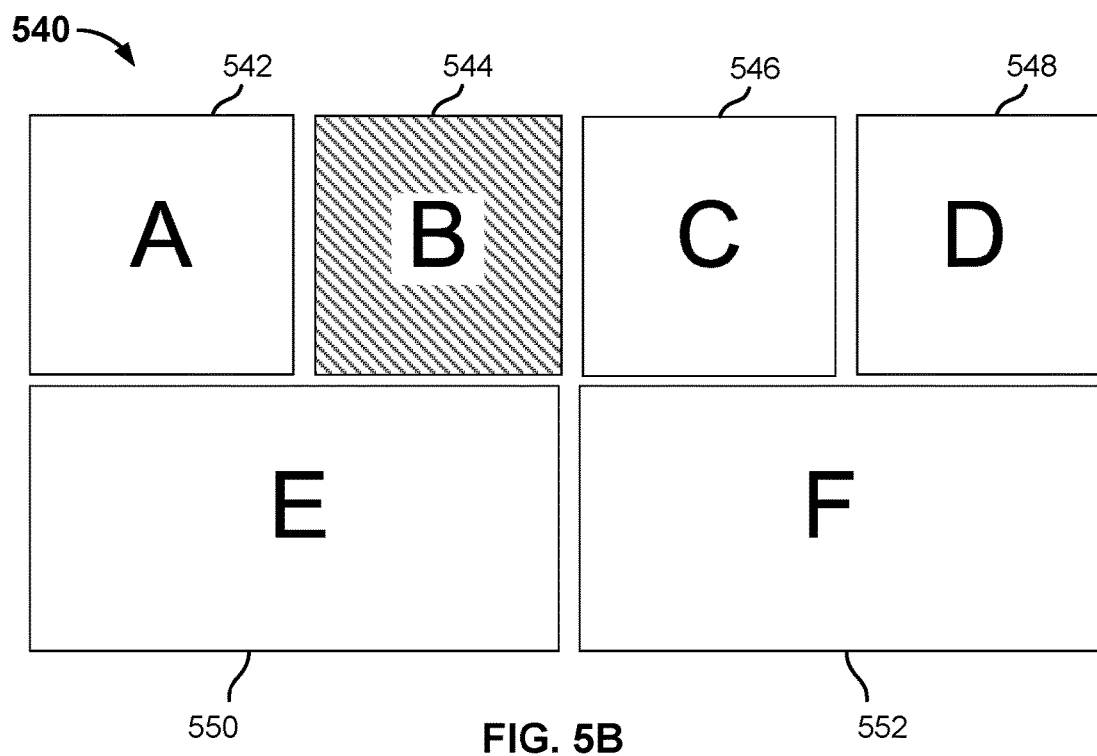
FIG. 5B is a diagram illustrating an embodiment of a visual display of operating zone safety state in a robotic line kitting system having a plurality of distinct operating zones.

FIG. 5B is a diagram illustrating an embodiment of a visual display of operating zone safety state in a robotic line kitting system having a plurality of distinct operating zones. In the example shown, display 540 shows a safety state of each of a plurality of zones 542, 544, 546, 548, 550, and 552, corresponding to gates 502, 504, 506, 508, 510, and 512, respectively, of FIG. 5A. In the example shown, the operating area associated with gate 504 as represented by operating area 544 is highlighted by a color or other visual indication of a potentially unsafe state, specifically in this example that the associated gate 504 is open. In some embodiments, the representation 540 may be displayed via a graphical user interface (GUI). In some embodiments, the representation 540 as shown in FIG. 5B may or may not be displayed. In some embodiments, the representation 540 is a conceptual representation of state information store in a data structure configured to track state information for each of the plurality of operating zones 542, 544, 546, 548, 550, and 552. In various embodiments, the stored state information is used to control robots 518 and 520 and/or stack conveyor 530 in a manner that takes the state information into account. For example, the robots 518 and 520 may not be operated in the operating area 544 due to the risk of harm to a human worker that the state information indicates may be present in the operating area 544. Or, the stack conveyor 530 may not be advanced during a time when operating area 550 and/or 552 may have a human in them.

In various embodiments, a user interface of a system as disclosed herein communicates standard operating procedures for operators to safely interact with the system, such as startup instructions, e-stop system before entering rail area and resetting output facings, validating correct robot arm positions before proceeding with system startup since that could indicate robots are in an error state, proper shutdown instructions with warnings before advancing stack mover to watch for moving input stack collision scenarios with robot arms, auto pausing input buffer advancement at the beginning of the operator insertion workflow process, etc.

In various embodiments, a robotic line kitting system as disclosed herein tracks the operating state (e.g., safe or unsafe for autonomous robot operation) of a workspace by distinct operating zone. The system performs fully autonomous work in operating areas in which it is deemed safe to do so and avoids or modifies autonomous operation of robotic instrumentalities, such as robots 518 and 520 and/or stack conveyor 530 of FIG. 5A, in zones in which a human may be present or another unsafe condition may be present.

FIG. 6A is a flow diagram illustrating an embodiment of a process to plan and dynamically update planning in a robotic line kitting system having a plurality of distinct operating zones. In various embodiments, the process 600 of FIG. 6A may be performed by a computer, such as control computer 128 of FIG. 1A. In the example shown, at 602 the robotic system dynamically plans and operates in zones not currently in an unsafe state, e.g., all zones other than operating zone 544 associated with gate 504 in the example shown in FIGS. 5A and 5B. Each time a change in the safety state of an operating zone is detected at 604, at 606 the system revised its plan dynamically as/if needed to continue to operate only in zones not marked as unsafe. At 606, the system may revise its plan to reassign, reorder, reprioritize, modify, reschedule, and/or cancel tasks as/if needed to avoid operating in an operating zone that has transitioned to an unsafe state, e.g., due to a gate being detected as having been opened (e.g., based on a signal from and/or associated with a sensor such as the gate sensor comprising components 505a and 505b in the example shown in FIG. 5A). Dynamic planning and (as/if needed) replanning continue (602, 604, 606) until the robotic system is done operating, e.g., the high-level objective(s) has/have been achieved (608).

FIG. 6B is a flow diagram illustrating an embodiment of a process to monitor and track operating zone safety state in a robotic line kitting system having a plurality of distinct operating zones. In various embodiments, the process 620 of FIG. 6B may be performed by a computer, such as control computer 128 of FIG. 1A. In the example shown, at 622 sensors associated with operating zone states are monitored. For example, sensors such as the gate sensor comprising components 505a and 505b in the example shown in FIG. 5A may be monitored. At 624, if a sensor is tripped, at 626 the corresponding zone is marked as unsafe. For example, in the example shown in FIGS. 5A and 5B, the opening of gate 504 may be detected based on a signal associated with the sensor comprising components 505a and 505b, resulting in the operating zone 544 associated with gate 504 being marked as "unsafe", as shown in FIG. 5B.

Once marked as "unsafe" at 626, an operating zone remains so marked unless/until a determination is made at 628 that all required sensors and/or indicators have been reset. For example, in addition to the gate sensor comprising components 505a and 505b in the example shown in FIG. 5A, other sensors may be present, such as motion detectors, computer vision-based sensors, light curtains, etc. For a determination to be made at 628 that all required sensors have been reset/cleared, every sensor that detected an unsafe or potentially unsafe state must be reset/cleared. In some embodiments, a determination at 628 that all required sensors have been reset/cleared further requires that a button or other manual input device located outside the barrier and gate that define and secure the operating zone has received an affirmative manual input indicating a human worker has exited the operating area, confirmed visually that no other human worker (and no other unsafe condition) remains present in the operating area, and that the gate has been securely closed.

Once a reset of all required safety sensors and devices has been received at 628 with respect to a given operating zone that has been marked as unsafe, at 630 the operating zone if marked as safe, enabling fully autonomous robotic operation to resume in that operating zone. In some embodiments, transitioning an operating zone to a safe state from an unsafe state triggers a dynamic replanning process, e.g., as at 606 of FIG. 6A, to enable the system to include in its plan operation of robotic instrumentalities in and near the newly cleared operating zone.

Operations continue as described above and illustrated in FIG. 6B until determined at 632 to be done, e.g., because the robotic system's high-level objective (e.g., fulfillment of all orders) has been achieved.

Figure 7:
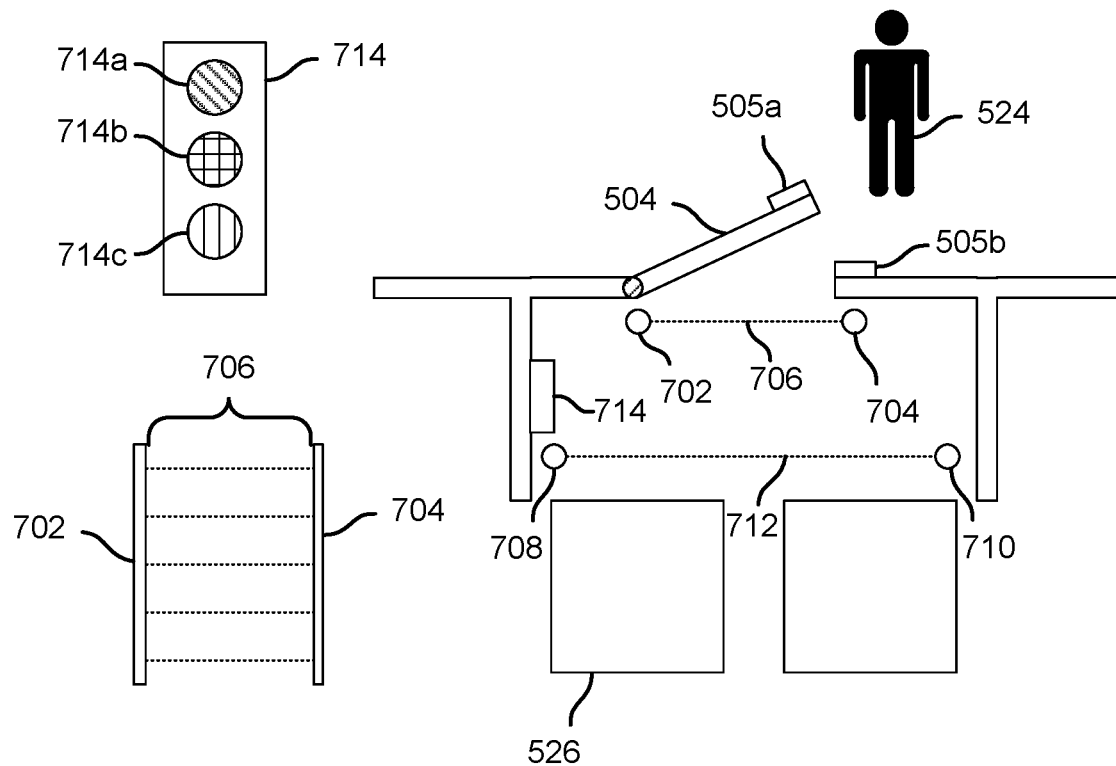
FIG. 7 is a diagram illustrating safety equipment in an embodiment of a robotic line kitting system having a plurality of distinct operating zones.
Figure 7:
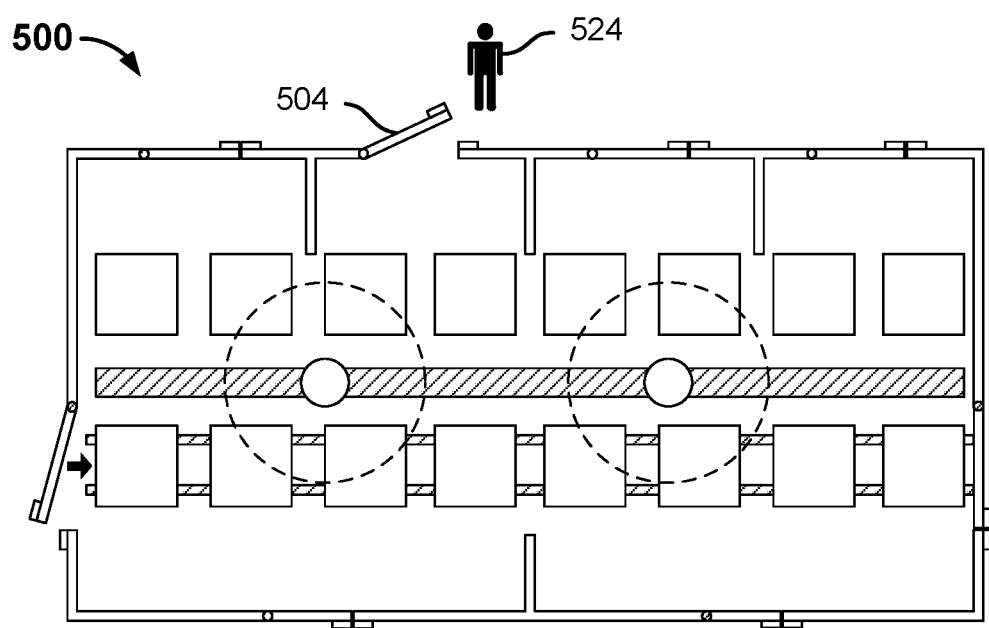

FIG. 7 is a diagram illustrating safety equipment in an embodiment of a robotic line kitting system having a plurality of distinct operating zones. In FIG. 7, a representation of system 500, with reference numerals only for structures relevant to FIG. 7, is reproduced for reference. In the example shown, an operating zone associated with gate 504 is shown to be provided with sensors and safety signals in addition to the gate sensor 505a, 505b shown in FIG. 5A. In the example shown, the gate sensor 505a, 505b detects and provides an output signal associated with the gate 504 being opened, as shown. In the condition shown, a nearby human worker 524 has not entered the operating zone associated with gate 504. A first light curtain sensor comprising vertical elements 702, 704 configured to emit light beams 706 between them, at various heights, as shown in the side view to the left in FIG. 7, and to detect and provide an associated output in the event one or more of the light beams 706 is/are broken, e.g., by a human worker such as human worker 524 walking between the vertical elements 702, 704. One of the vertical elements 702, 704 may include a plurality of IR or other light emitters, each pointed at a reflector position on the other vertical element 702, 704. The light reflected back to the emitter side is sensed. If the reflected back light is no longer present, an output indicating the light beam has been broken is provided, e.g., to a control computer such as computer 128 of FIG. 1A.

In the example shown in FIG. 7, the first light curtain 702, 704, 706 is positioned to detect that a person, such as human worker 524, has entered the operating area associated with gate 504, but not how far the person has advanced into the operating zone. In this example, a second light curtain comprising vertical elements 708, 710 and light beams 712 is positioned to detect that a person in the operating zone associated with gate 504 has approached near to the output stacks (e.g., stack 526) being assembled in the operating zone.

In various embodiments, multiple sensors in various positions within an operating zone may be used to determine with greater certainty and/or granularity a safety state of the operating zone. For example, in the example shown in FIG. 7, a first level unsafe condition may be associated with opening of gate 504 (e.g., as detecting based on the gate sensor 505a, 505b); a second, higher level unsafe condition may be associated with an open gate 504 and triggering of the first light curtain 702, 704, 706; while a third, highest level of unsafe condition may be associated with triggering of the second light curtain 708, 710, 712.

In various embodiments, a robotic line kitting system as disclosed herein is configured to respond to detected changes in the safety or other operational state of each of a plurality of operating zones, including by adapting in a different manner and/or to a different extent depending on a level or other characteristic of a specific one of a plurality of safety states in which a given operating zone may be. For example, in the example described above, in response to the gate 504 being opened but the first light curtain 702, 704, 706 and the second light curtain 708, 710, 712 not being triggered, the system may sound an audible alarm, illuminate a warning light, and begin to plan to operate only in areas other than the operating zone associated with gate 504. Upon detecting that the first light curtain 702, 704, 706 has been triggered, the system may further adapt, e.g., by initiating a two-step, controlled safety stop of any robot operating in or near the operating zone associated with the gate 504 and/or by emitting a different audible and/or visual alarm or indication of the safety state. Finally, triggering of the second light curtain 708, 710, 712 may prompt the system to perform an emergency stop of any robot operating in or near the operating zone. For example, if the system had been completing a task in the operating zone and was in the process of replanning operations to operate only in other zones but had not quite finished a task by the time the second light curtain 708, 710, 712 was triggered, an emergency stop of the robot operating in the operating zone may be performed, e.g., by sending a signal from a control computer, such as control computer 128 of FIG. 1A, to the robot to command the robot to conduct an emergency stop.

Referring further to FIG. 7, a signal light array 714 is positioned in the operating area associated with gate 504, in a position and orientation to be visible to a person entering the operating zone via the gate 504. As shown in the front view in the upper left corner of FIG. 7, the signal light array 714 in this example includes a green light 714a at top, a yellow light 714b in the middle, and a red light 714c are bottom. In some embodiments, each of the three colored lights 714a, 714b, 714c may correspond to a different level of safe/unsafe state. For example, in one scheme, a red light 714c may indicate to a person, such as human worker 524, that it is not (yet) safe to enter the operating zone. For example, opening of gate 504 may cause the red light 714c to become (or remain) illuminated, and/or for the red light to flash or pulse and/or an audible alarm or warning to sound, while the system performs a controlled stop (or safe completion) of any tasks being performed by any robot in or near the operating zone. The signal light array 714 may transition to a state in which the yellow light 714b is illuminated, e.g., if the robotic system has completed or paused any tasks being performed by any robot in the operating zone but is still operating in adjacent zones, for example. In a state in which the yellow light 714b is illuminated, by way of example, a human worker 524 may be permitted to enter the operating zone, but not to approach the output stacks. Finally, illumination of the green light 714a may indicate it is fully safe for a human worker, such as human worker 524, to enter and perform tasks in the operating zone. In some embodiments, the yellow light 714b may again be illuminated in certain circumstances, such as if a robot is transiting along or working near a boundary of the operating zone during a time when a human worker is or may be in the operating zone.

Figure 8A:
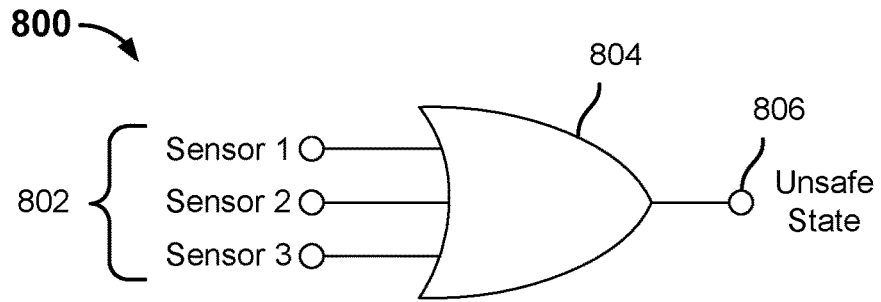
FIG. 8A is a block diagram illustrating an embodiment of a module or subsystem to detect an unsafe state in a robotic line kitting system.

FIG. 8A is a block diagram illustrating an embodiment of a module or subsystem to detect an unsafe state in a robotic line kitting system. In various embodiments, module or subsystem 800 may be implemented in hardware, e.g., as a logic circuit, or software (e.g., as application logic), or a combination of both. In the example shown, the module or subsystem 800 includes a plurality of safety sensor signals 802 associated with a same corresponding operating zone, such as the gate sensor 505a, 505b; first light curtain 702, 704, 706; and second light curtain 708, 710, 712 of FIG. 7. The safety sensor signals 802 are provided as inputs to a logical "OR" circuit or logic 804. As a result, an "unsafe state" output 806 is in a logic "high" state associated with an unsafe condition if any one or more of the safety sensor signals 802 is high (e.g., one or more of gate 504 open; first light curtain 702, 704, 706 triggered; and second light curtain 708, 710, 712). In various embodiments, once the output 806 has toggled to the "high" state, the output 806 will not toggle back to the "low" (safe) state unless/until all the safety sensor signals 802 are in the low/reset state (e.g., all of the following true: gate 504 closed; first light curtain 702, 704, 706 not triggered; and second light curtain 708, 710, 712 not triggered). In some embodiments, once the output 806 has toggled "high", to toggle the output 806 back to "low" (safe state) a manual "reset" device must also be activated, in addition to the safety sensor signals 802 all being "low", such as a manual reset button located outside the gate 504 in the example shown in FIGS. 5A and 7.

Figure 8B:
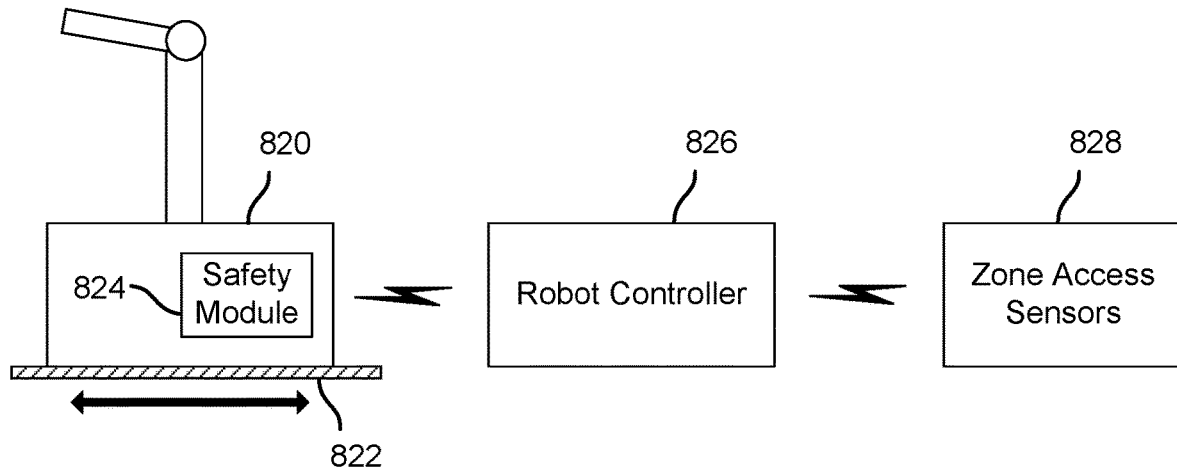
FIG. 8B is a block diagram illustrating an embodiment of a module or subsystem to detect an unsafe state in a robotic line kitting system.

FIG. 8B is a block diagram illustrating an embodiment of a module or subsystem to detect an unsafe state in a robotic line kitting system. In the example shown, a robot 820 configured to move along a rail 822 and having a robotic arm comprising a plurality of segments connected via motorized joints includes a safety module 824. The safety module 824, in various embodiments, is configured to receive readings from one or more onboard and/or external sensors and to use an internal model and state information to maintain an awareness of the position of the robot 822 along rail 822 and of the position and orientation of the segments comprising the robotic arm. In various embodiments, the safety module 824 comprises a robot motion monitoring safety unit, such as the Kawasaki™ Cubic-S™ safety monitor. In various embodiments, safety module 824 enables motion area boundaries to be defined and monitored electronically. If the robot reaches a boundary associated with a zone in which the robot is configured not to operate, the safety module 824, if so configured, stops the robot, e.g., by cutting off power to its motor(s). Areas in which the robot is and is not permitted to operate can be redefined dynamically, in various embodiments, e.g., based on readings from safety sensors.

In various embodiments, the safety module 824 is operated under control of a robot controller 826, e.g., a robot control process or module running on a control computer, such as control computer 128 of FIG. 1A. Zone access sensors 828, e.g., gate sensor 505*a*, 505*b*; first light curtain 702, 704, 706; and/or second light curtain 708, 710, 712 of FIG. 7, for each of a set of one or more zones are received, e.g., via wireless and/or wired communication, by the robot controller 826. In some embodiments, safety signals from and/or derived from the zone access sensors 828 are provided to the safety module 824. In some embodiments, robot controller 826 may interact with safety module 824 to perform a controlled, two-step stop or pause as disclosed herein, e.g., in response to signals received from zone access sensors 828.

In various embodiments, robot controller 826 receives position information, e.g., for robot 820 along rail 822 and/or for one or more segments or "axes" comprising the robotic arm of robot 820, from safety module 824. For example, for each of a plurality of operating zones, a corresponding monitoring zone may be programmed in or for safety module 824. Rather than stopping its motion upon entering a zone, the safety module 824 provides as output data indicating it has entered a given operating zone. For example, if a chassis of robot 820 that translates along rail 822 enters a configured zone, safety module 824 provides a signal to robot controller 826 indicating the chassis has entered that zone. Similarly, if a segment of the robotic arm enters an operating zone, a corresponding data is supplied to robot controller 826. In this way, the safety module 824 serves as a robot position sensor to be used by robot controller 826 to detect that the robot has entered a given operating zone (or will enter the zone under a planned operation, in some embodiments). The robot controller 826, in various embodiments, combines the robot location/position information with other inputs, such as from zone access sensors 828, to control operation of the robot as disclosed herein.

For example, in some embodiments, the co-occurrence of a robot being present in a given zone and one or more other conditions may trigger the robot controller 826 to perform a responsive action, such as to initiate and a controlled and/or emergency stop of the robot.

In various embodiments, in addition to information reflecting the presence or not of the robot 820 in a given operating zone, the safety module 824 provides to robot controller 826 other operational data, such as the velocity at which the end effector and/or other components comprising or attached to the robot 820 is moving; the position, orientation, and rate of change of joints and/or segments comprising a robotic arm or other instrumentality of the robot 820; etc. In various embodiments, information received from safety module 824 is used by robot controller 826 to determine a control or command to provide to robot 820, such as a manner in which to perform a two-stage or other modified stop or pause, such as those described above in connection with FIGS. 2A-2C, 3A-3D, and 4.

Figure 8C:
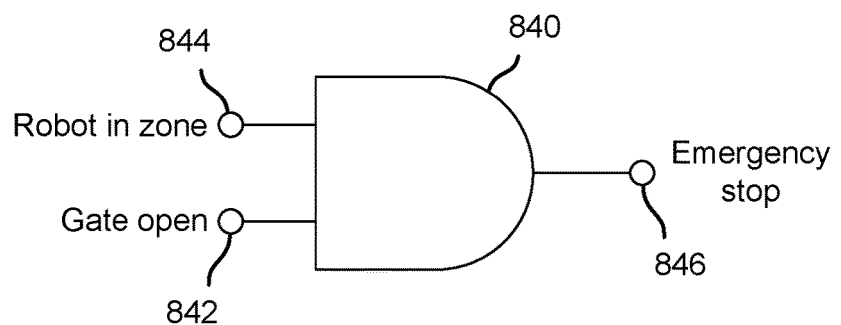
FIG. 8C is a block diagram illustrating an embodiment of a module or subsystem to trigger an emergency stop in a robotic line kitting system.

FIG. 8C is a block diagram illustrating an embodiment of a module or subsystem to trigger an emergency stop in a robotic line kitting system. In the example shown, a signal 842 indicating that a gate associated with an operating zone and/or robotic instrumentality is open is combined via a logical "AND" operation 840 with a signal 844 indicating a robot has entered a configured/defined zone, such as an operating zone, to generate an output 846 configured to prompt/initiate an emergency stop if both inputs 842, 844 are true/high. In some embodiments, the "robot in zone" input 844 is received from and/or based on data received from a motion/position monitoring safety module of the robot, such as safety module 824 of FIG. 8B. The module or subsystem of FIG. 8C would trigger an emergency stop, for example, if a gate is detected to be open (842 high level) and the robot is determined to be at least partly present (844 high level) in the same operating zone with which the gate is associated. By contrast, opening of the same gate (842 high level) at a time when no part of the robot is in the associated operating zone (844 low level) would not result in an emergency stop (846) being triggered.

Figure 9:
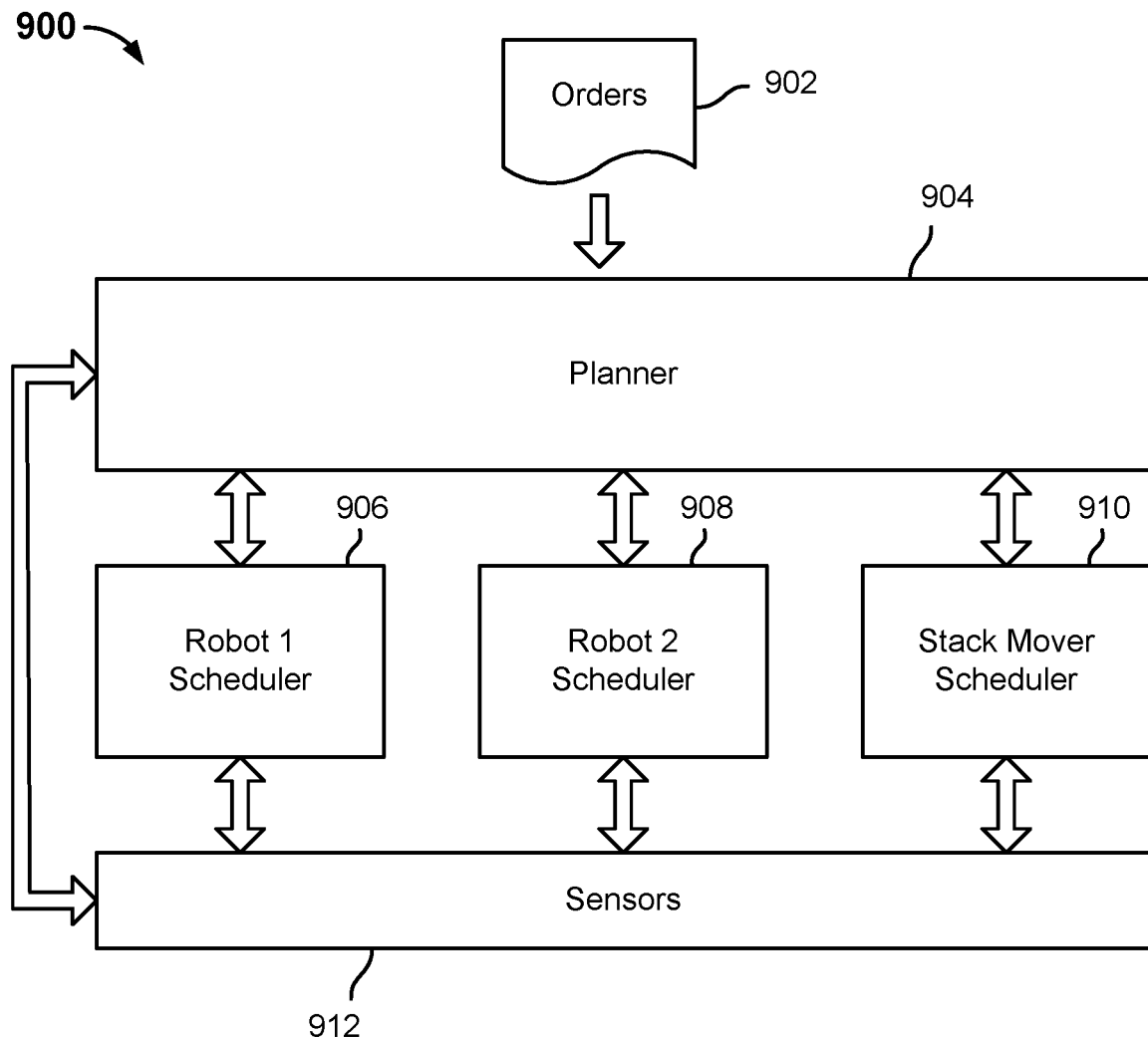
FIG. 9 is a block diagram illustrating an embodiment of a system to plan, schedule, and perform tasks to achieve a higher-level objective via autonomous robotic operation in an embodiment of a robotic line kitting system.

FIG. 9 is a block diagram illustrating an embodiment of a system to plan, schedule, and perform tasks to achieve a higher-level objective via autonomous robotic operation in an embodiment of a robotic line kitting system. In various embodiments, all or some of the elements comprising control system 900 are implemented as software modules, processes, and/or subsystems running on a control computer, such as control computer 128 of FIG. 1A. In the example shown, a set of order data 902 is received by a planning module 904. The orders 902 represent a set of one or more high-level objectives, such as to assemble a corresponding specific set of output stacks to be delivered to each of a plurality of destinations. For example, a bakery or other wholesale distribution center for baked goods may be received input stacks of trays, each having a corresponding type of baked good product, and may be tasked to assemble output stacks for different retail stores based on orders received from or on behalf of such stores.

In the example shown, planning module 904 receives state information from sensors 912, such as cameras or other imaging devices, bar code or other optical or RF scanners, etc. Some state information may be provided as input, e.g., via a configuration file or other data indicating the types and quantity of items that will be included in which input stack, received in which order, etc. The planning module 904 interacts with scheduler modules, such as schedulers 906, 908, 910 in the example shown, each configured to autonomously and independently schedule and control operation of a corresponding robotic instrumentality, such as a robotic arm (906, 908) and/or a stack mover (910) in this example, which corresponds to a system such as system 100 of FIGS. 1A and 1B.

In various embodiments, planning module 904 maintains high level state (e.g., which input stacks are present and/or arriving to the input buffer/stack mover; which orders have been fulfilled and which remain waiting to be fulfilled, etc.). Robot schedulers 906 and 908 operate independently, pulling tasks from a queue or plan generated by planning module 904 to be completed via autonomous operation, each robot operating independently of the other. A stack mover scheduler 910 advances the input buffer stack mover, e.g., once a last position (or more) of the stack mover has been emptied, e.g., as a result of the robots picking trays from that position in the input buffer/stack mover to assemble output stacks. Advancing the stack mover, in various embodiments, frees up a position on an input end of the stack conveyor for a next stack to be added, e.g., by one or more human workers, as in the example shown in FIG. 1B.

In various embodiments, potential conflicts among the robots and/or stack mover are resolved by the planning module 904 intervening to cause one or more of the robot schedulers 906, 908 and the stack mover scheduler 910 to pause operation while one or more other robotic instrumentalities completes an otherwise (potentially) conflicting task. For example, the robot schedulers may be prompted to pause in a state in which the respective robots they control are not active in the input buffer area, or to focus on and perform tasks not involving operating in the input buffer zone, to enable the stack mover to be advanced by stack mover scheduler 910 without colliding with a robotic arm. Or, if the planning module 904 detects a potential collision between two or more robots, the planning module 904 may cause one robot to pause and/or turn to other non-conflicting tasks while the other robot performs the operation or task giving rise to the detected (potential) collision.

In various embodiments, a hierarchical planner/scheduler as shown in FIG. 9 is configured to perform operating zone-aware robotic control as disclosed herein. For example, in various embodiments, a change in safety state of one of a plurality of operating zones may cause one or both of the planning module 904 and the robot schedulers 906, 908 and/or stack mover scheduler 910 to modify its planned/scheduled operation if/as needed to avoid operating in an operating zone that has changed to a safety state such that the robot should not operate in that operating zone. In some embodiments, dynamic replanning is performed, if/as needed and feasible, to continue to make progress toward the higher-level objective(s) (e.g., fulfilling the orders 902) while operating only in operating zones in which it remains safe to operate.

Figure 10A:
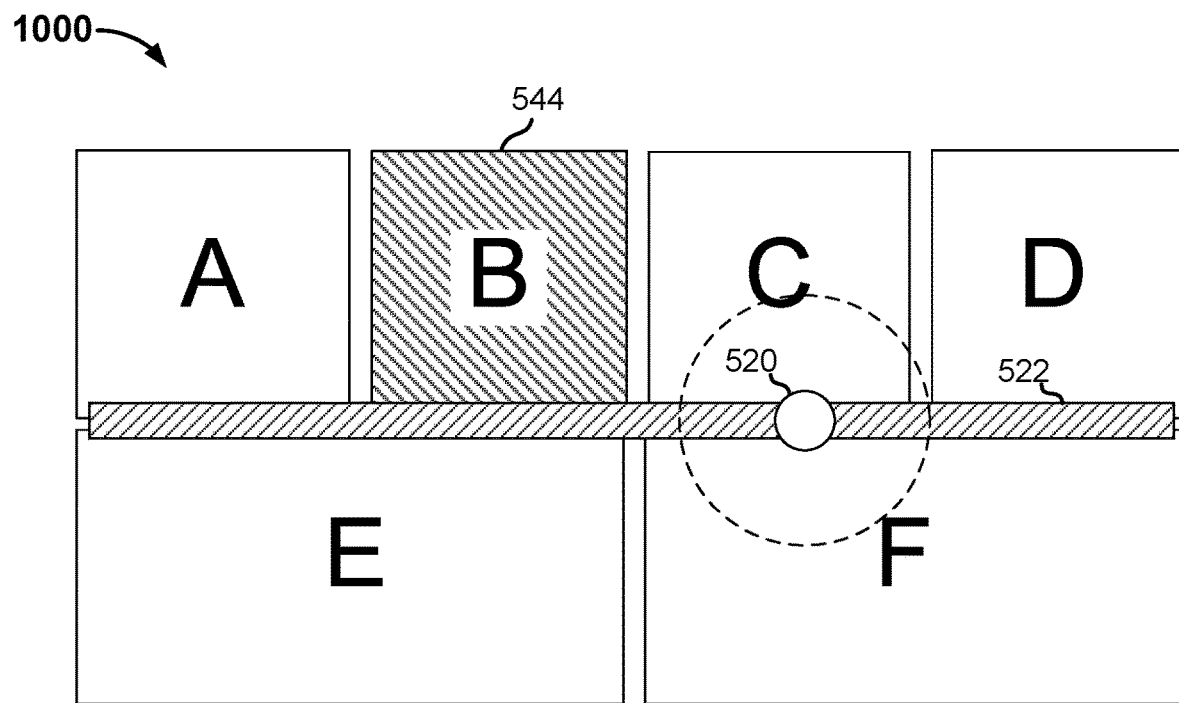
FIG. 10A is a diagram illustrating an embodiment of a robotic line kitting system having a plurality of distinct operating zones.

FIG. 10A is a diagram illustrating an embodiment of a robotic line kitting system having a plurality of distinct operating zones. In the example shown, the system and workspace 1000 includes a plurality of zones, labeled "A" through "F" in this example, corresponding to the zones as illustrated in FIG. 5B for the system 500 of FIG. 5A. As described above in connection with FIGS. 5A, 5B, and 7, the zone B" 544 is shown to be in a state associated with potential and/or detected presence of a human worker in that zone. For example, referring to FIGS. 5A and 7, gate sensors 505a, 505b may have provided a signal indicating gate 504 is open; or one or both of the first light curtain 702, 704, 706 and second light curtain 708, 710, 712 may have been tripped.

In the state shown in FIG. 10A, in various embodiments robotic operation in zone "B" 544 may be suspended. A robot, such as robot 520 in the example shown, in various embodiments remains available to the system to be used in zones other than the zone "B" 544, such as zones A, C, D, E, and F in the example shown.

In the example shown in FIG. 10A, the robot 520 is configured to move along rail 522, under robotic control, to access areas adjacent to rail 522, such as to pick trays from input stacks of trays in input buffer zones E and F and place them in output areas such as A, B, C, and D to build output stacks of trays. In the state shown in FIG. 10A, robot 520 would not be able to reach and pick from input stacks of trays in zone E and/or to place trays on output stacks in zone A without transiting past zone B 544 along rail 522.

In various embodiments, a robot such as robot 520 is configured and/or controlled to enter a safe transit mode to pass by or through a given operating zone, e.g., depending a current state of that zone. For example, referring to FIGS. 5A, 5B, 7, and 10A, if zone "B" 544 were in a state associated with the gate 504 being detected to be open but the light curtains 702, 704, 706 and 708, 710, 712 have not been tripped, the robot 520 may be operated in a mode that allows robot 520 to move at normal operating speed past zone "B" 544, but without allowing any part of the robot (e.g., robotic arm segments) to extend into the zone "B" 544. The robot may also emit an audible and/or visual warning as it transits past the zone "B" 544. If in addition to the gate 504 being detected to be open the first light curtain 702, 704, 706 were tripped, the system may allow the robot 520 to move along rail 522 past zone "B" 544 only in a further safe transit mode, such as with its robotic arm in a stowed or central position (so as not to extend into the zone "B" 544) and at a much reduced speed, to decrease the risk of harm to a human present in the zone "B" 544.

In some embodiments, activation of a sensor nearer the boundary along which a robot, such as robot 520, would have to pass an operating zone such as zone "B" 544, such as the second light curtain 708, 710, 712 in the example shown in FIG. 7, would result in the robot 520 being prevent from transiting past the zone "B" 544. For example, the robot 520 in the position as shown in FIG. 10A may be limited to picking from input buffer zone F and placing to output stacks in zones C and D.

Figure 10B:
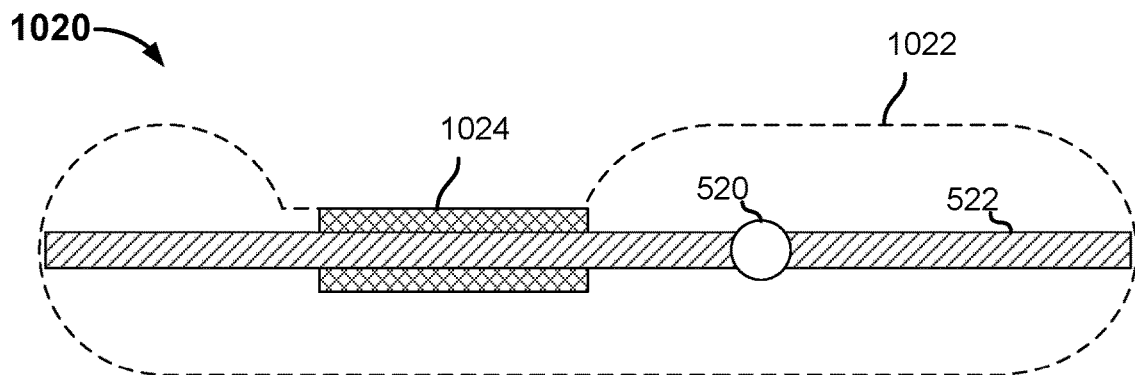
FIG. 10B is a diagram illustrating distinct operating zones and modes based on zone-specific safety state information in an embodiment of a robotic line kitting system.

FIG. 10B is a diagram illustrating distinct operating zones and modes based on zone-specific safety state information in an embodiment of a robotic line kitting system. In the example shown, diagram 1020 illustrates areas in which the robot 520 may operate freely (full operating speed) and with restrictions (e.g., appropriate safe transit mode) given the zone safety states illustrated in FIG. 10A. The dashed line 1022, in this example, shows areas in which the robot 520 may operate freely (e.g., fully autonomously and at full operational speed), which the cross-hatched area 1024 represents the region through which the robot 520 must pass only in the appropriate safe transit mode.

In various embodiments, entry into the safe transit zone 1024 is detected, at least in part, using the robot's onboard safety module, as in the example shown in FIG. 8B. In some embodiments, the safety module 824 may be programmed, configured, updated, and/or controlled dynamically to detect and provide output indicating the robot is in the safe transit zone 1024.

In various embodiments, a plan and/or schedule for the use of a robot, such as robot 520 in the example shown in FIGS. 10A and 10B, is updated dynamically as/if needed to optimize use of the robot given the high level objective(s) to be achieved, the degree or extent to which such objectives have been attained, and the state of input and output stacks and/or other current fulfillment state information and/or other current context information, along with the operating zone (or sub-zone) restrictions that currently apply, e.g., as shown in FIG. 10B.

Figure 11:
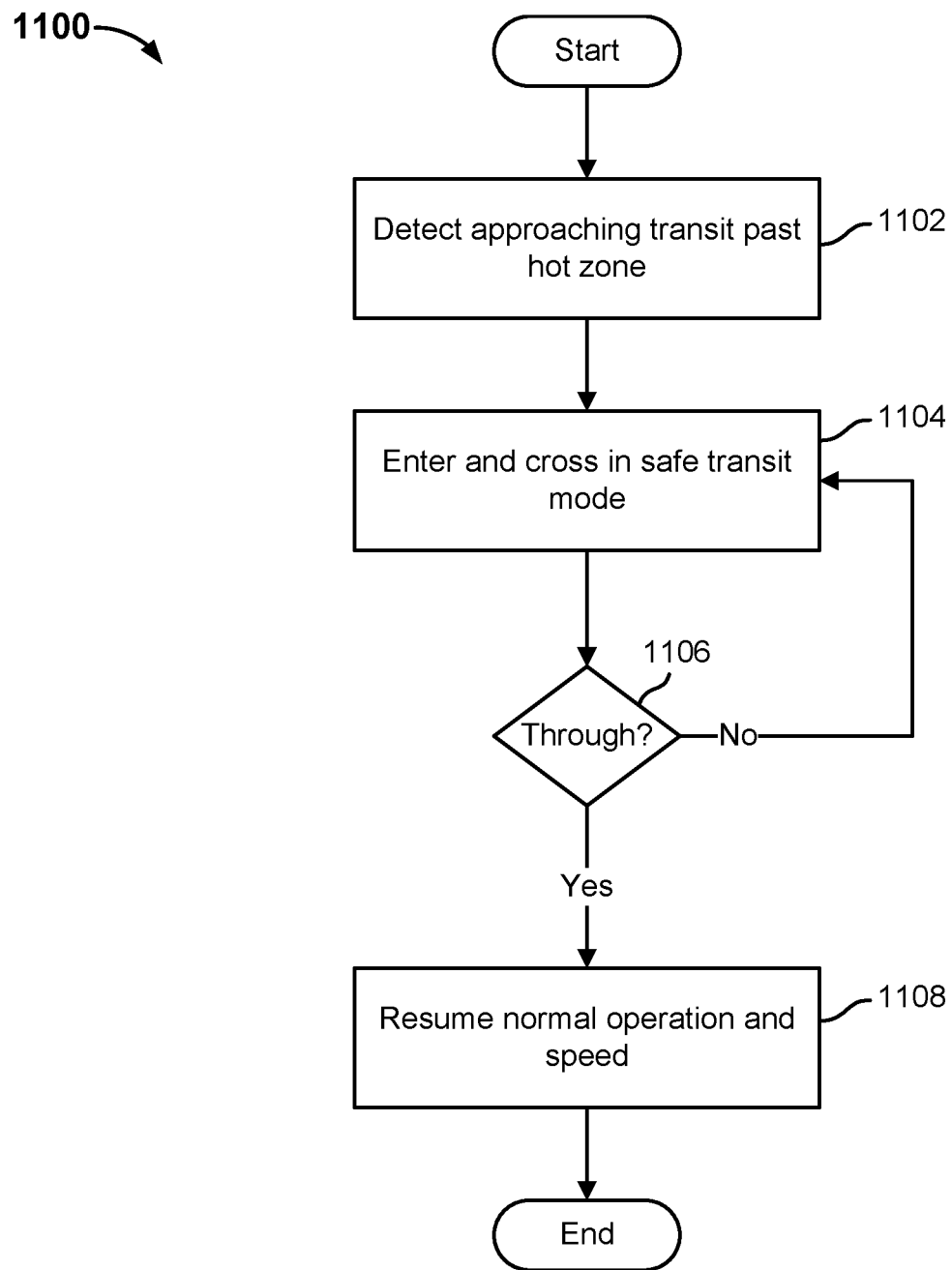
FIG. 11 is a flow diagram illustrating an embodiment of a process to transit through or adjacent to an operating zone in a safe transit mode.

FIG. 11 is a flow diagram illustrating an embodiment of a process to transit through or adjacent to an operating zone in a safe transit mode. In various embodiments, the process 1100 of FIG. 11 may be performed by a control computer, process, or module, such as control computer 128 of FIG. 1A, robot controller 826 of FIG. 8B, and/or one or more of planner 904 and schedulers 906, 908, and 910 of FIG. 9. In the example shown, at 1102, it is detected that a robot is approaching an unsafe (or otherwise "hot") zone or sub-zone. For example, in the example shown in FIGS. 10A and 10B, it may be determined that the robot 520 is about (or is being scheduled or being considered to be scheduled) to enter the safe transit zone associated with region "B" 544 and indicated by cross-hatched area 1024 of FIG. 10B. At 1104, the robot enters and crosses the safe transit zone in a "safe transit" mode, e.g., as described above. Once the robot has completed its transit through the safe transit zone in the safe transit mode (1104, 1106), at 1108 the robot resumes operating in a normal manner and at normal operating speed.

In various embodiments, a robotic line kitting system as disclosed herein controls a robotic instrumentality, such as a rail or other chassis-mounted robot having a robotic arm comprising a plurality of segments, in a manner that avoids or reduces the likelihood of a collision between the robot or any part thereof or any item in the robot's grasp with any other object(s) in the environment, including by coordinating the operation of two or more robotic instrumentalities so as to avoid such conflicts. For example, in a line kitting operation as illustrated in FIGS. 1A, 1B, 5A, 5B, 7, 9, 10A, and 10B, advancement of the stack mover (e.g., stack mover 106 of FIGS. 1A and 1B or stack mover 530 of FIG. 5A) may be coordinated such that the input stacks are advanced only if no part of any other robot (e.g., 112, 114,518, 520) is present in space that would result in a collision with input receptacles still in stacks in the input buffer, and likewise operation of the other robots may be scheduled and otherwise controlled to avoid entering space above the input buffer, e.g., at a height above ground such that a stack to be advanced on the input buffer may or would collide with the robot.

Figure 12A:
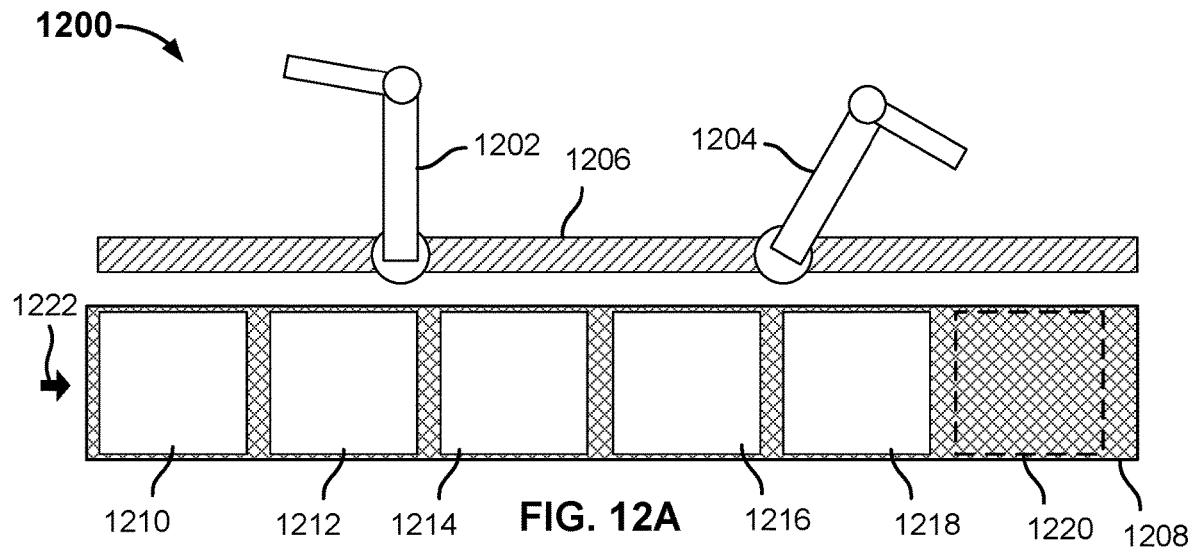
FIG. 12A is a diagram illustrating a top view of an embodiment of a robotic line kitting system configured to pick trays of items from an input buffer zone.

FIG. 12A is a diagram illustrating a top view of an embodiment of a robotic line kitting system configured to pick trays of items from an input buffer zone. In the example shown, robotic line kitting system 1200 includes robots 1202 and 1204 mounted on, and configured to move under robotic control along, rail 1206. System 1200 further includes a robotically controlled stack mover (e.g., conveyor) 1208 shown in a state in which input stacks over varying heights are present on locations 1210, 1212, 1214, 1216, and 1218 of stack mover 1208 and a position 1220 is empty. For example, all trays or other receptacles previously stacked at location 1220 may have been picked by robots 1202 and 1204 and placed on output stacks on the side of rail 1206 opposite the input stack mover 1208.

In the state shown in FIG. 12A, a human or robotic worker may be tasked with adding input stacks to the first position 1210 of stack mover 1208, when empty and the user is prompted and/or has determined it is safe to do so, as indicated by arrow 1222. For example, the system 1200 may have a task queued and/or scheduled to advance the stacks in positions 1210, 1212, 1214, 1216, and 1218 each one position to the right, so that the stack shown in position 1218 is in position 1220 and the position 1210 is empty and ready to have a new input stack loaded.

Figure 12B:
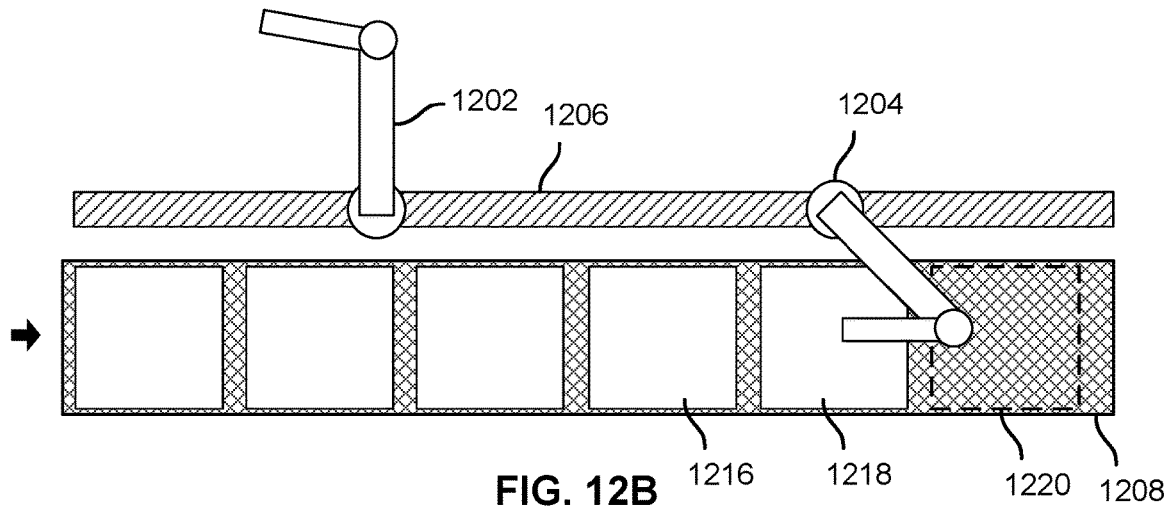
FIG. 12B is a diagram illustrating a robotic arm of the robotic kitting system of FIG. 12A in a position above an input stack in the input buffer zone.

FIG. 12B is a diagram illustrating a robotic arm of the robotic kitting system of FIG. 12A in a position above an input stack in the input buffer zone. In the state shown in FIG. 12B, the robot 1204 has moved its robotic arm into a position above the input stack in position 1218 of stack mover 1208. For example, the robot 1204 may be scheduled/assigned to pick one or more trays from the top of the stack in position 1218 to place on an output stack.

Figure 12C:
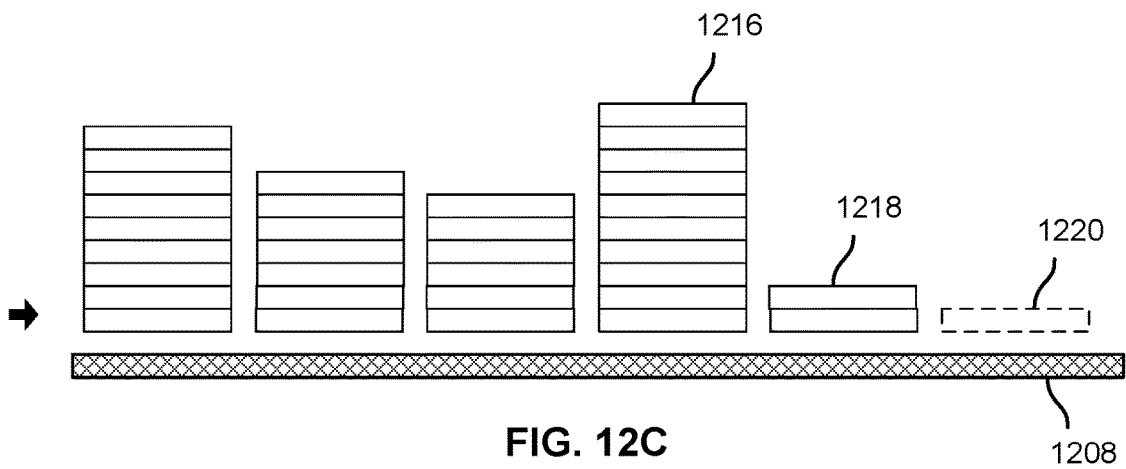
FIG. 12C is a diagram illustrating a front elevation view of input stacks in the input buffer zone of the robotic kitting system 1200 of FIG. 12A.

FIG. 12C is a diagram illustrating a front elevation view of input stacks in the input buffer zone of the robotic kitting system 1200 of FIG. 12A. In the state shown, one can see that the stack in position 1218 is much shorter than the stack in position 1216. In the conditions shown, the robot 1204 would have to reach down into the space adjacent to the upper part of the stack in position 1216 as shown. If the stack mover 1208 were advanced at a time when the robot 1204 was in such a position, the stack 1216 may collide with the robot 1204 or an item in its grasp.

In various embodiments, a robotic line kitting system as disclosed herein avoids such actual or potential conflicts by coordinating autonomous operation of multiple robotic instrumentalities, such as robot 1204 and stack mover 1208 in the example shown in FIGS. 12A, 12B, and 12C, to maximize (or at least increase) throughput and/or efficiency while avoiding conflicts. In some embodiments, a higher-level scheduler, such as planner 904 in the example shown in FIG. 9, may detect that independently generated schedules for two or more robotic instrumentalities (may) conflict. For example, robot scheduler 908 or FIG. 9 may have scheduled robot 1204 to pick a tray from position 1218 of stack mover 1208 and stack mover scheduler 910 may have scheduled stack mover 1208 to advance too soon thereafter, such that the robot 1204 would not yet be clear of the space into which the upper portion of the stack in position 1216 as shown in FIG. 12C would be moved. In response, the planner 904 (or stack mover scheduler 910) may prompt stack mover scheduler 910 to delay advancing the stacks on stack mover 1208. For example, a prescribed, configured, computed, and/or random delay, or a delay until an indication is received that the robot 1204 has moved clear of the input buffer.

In some embodiments, under the circumstances described above, the system may instead determine to delay/abort the task by robot 1204, e.g., until the stacks have been advanced. The planner 904, for example, may detect the conflict and select which task to allow to proceed and which to delay based on a determination as to which path is more optimal for the overall system 1200. For example, a cost function or other technique may be used to determine which task(s) should be completed in which order by which robotic instrumentality.

Figure 13:
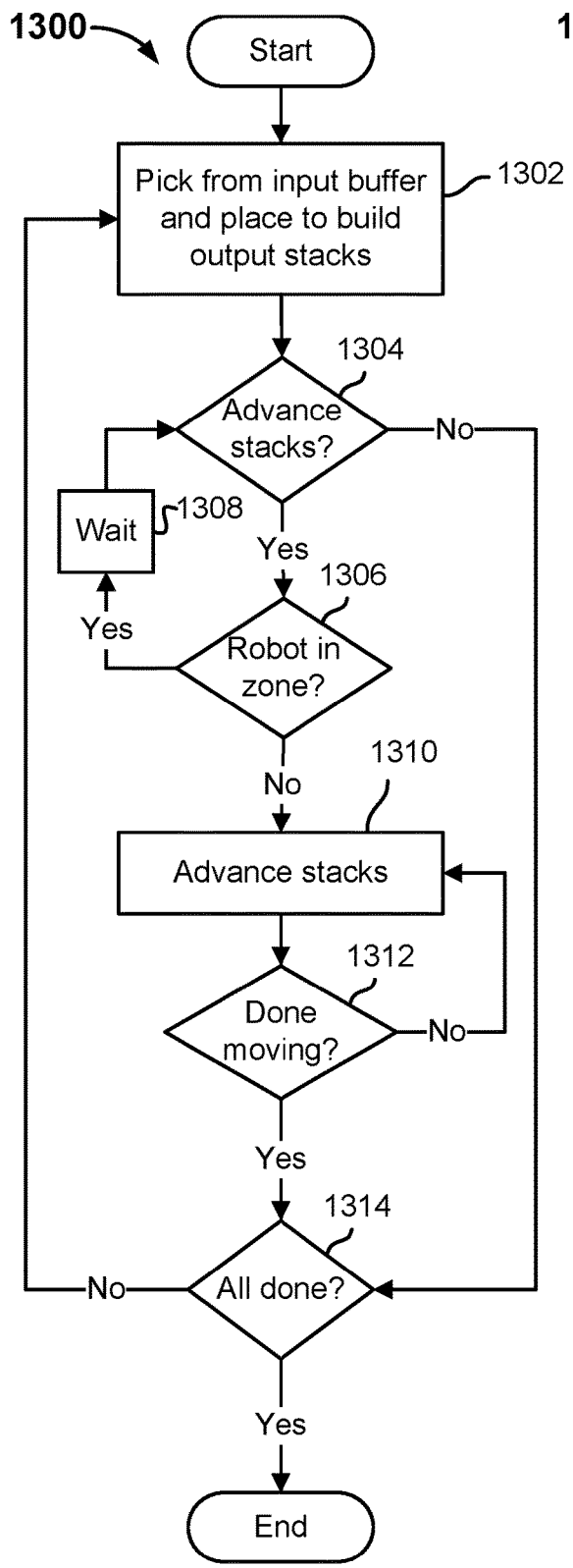
FIG. 13 is a flow diagram illustrating an embodiment of a process to avoid collisions between input stacks and a robotic arm.

FIG. 13 is a flow diagram illustrating an embodiment of a process to avoid collisions between input stacks and a robotic arm. In various embodiments, the process 1300 of FIG. 13 is performed by a computer, process, or module, such as control computer 128 of FIG. 1A and/or one or more of planner 904 and schedulers 906, 908, and 910 of FIG. 9. In the example shown, at 1302, each of one or more robots operates autonomously and independently of other robots to pick items (e.g., trays of items) from an input buffer and place them in corresponding destination in an output area (e.g., output stacks of trays). Upon receiving an indication received at 1304 to advance stacks in the input buffer—e.g., because one or more input stacks of trays have been completely moved to output stacks, leaving one or more locations empty in the input buffer—a determination is made at 1306 as to whether any part of any robot is or will imminently be present in the input buffer area in a location/space such that a collision could occur if the stacks were advanced. If a robot is or will imminently be in a position that could result in a collision (1306), the system waits at 1308 (e.g., a random interval) and checks again to determine if the stack mover can be advanced safely (1304, 1306). Once it is determined at 1306 that the stack mover can safely be advanced, the stacks are advanced at 1310. Once the stack mover has stopped (1312), if more work remains to be done (1314) the system resumes fully autonomous operation of the robots (1302) until the next time the stacks are determined to need to be advanced (1304 and following).

In various embodiments, a robotic line kitting system as disclosed herein coordinates work by and among robots and humans to achieve a high-level goal in a manner that optimizes robot productivity, use, and throughput while assigning to human workers tasks that cannot be performed by a robot. The human tasks are defined and scheduled to be performed in a manner that ensures safety. For example, a human may be scheduled to perform a task in a zone-based system, as disclosed herein, and while the human is performing the scheduled task the system operates one or more robots in operating zones other than a zone or zones in which the human must be present to perform the task. In various embodiments, a non-critical human task, e.g., one that can be completed other than immediately, such that other work can safely be performed by autonomous robots until a later, scheduled time at which the human work is scheduled and/or prompted to perform the human task, is scheduled to be performed at a time determined at least in part based on context information and a determination by the system as to when the human task should be performed. The decision may be based, for example, on a current position of one or more robots, tasks in progress or scheduled to be performed by each robot, the current state of input and output stacks or other units or receptacles, and the current extent to which higher level objectives or shorter-term operations have been completed.

In some embodiments, the need to schedule or prompt a human worker to perform a task may be determined at least in part based on force or other "tactile" feedback detected via a robot interacting with the workspace, environment, and/or items or sets of items being manipulated by the robot(s). For example, an array of force sensors in a "wrist" structure via which an end effector is connected to the free moving end of a robotic arm may be used to detect weight, other forces, and moments associated with a condition that may require intervention by a human worker. For example, a robot's force sensor array readings may be used to detect that an item has been knocked off or out of a tray other receptacle in the robot's grasp. For example, if the measured weight changes from a level expected for a tray in the robot's grasp to a non-zero level somewhat lower than the previously detected weight, the system may determine that an item may have dropped out of the tray. In such a circumstance, a typical prior system may immediately stop the robot and possibly abort the task or operation to enable a human worker to immediately assess and, if necessary, address and correct the situation.

In various embodiments, a system as disclosed herein determines whether a human worker should be prompted to immediately take corrective action or instead should be scheduled to take corrective action in a future time. For example, the system may determine to allow one or more robotic tasks schedule to be performed in the same operating zone as the condition that requires (or may require) human intervention, and to schedule a temporary stop to robotic operations in the zone at a future time at which a human task to address the detected condition is schedule. A human worker may be informed in advance of the scheduled task, e.g., via a notification, user interface, or otherwise. At the scheduled time, the system stops robotic operation in the operating zone (e.g., moving on to work in other zones) and prompts the human to complete the task requiring human intervention. For example, a human may be tasked to check for and pickup and if undamaged return to its tray an item that may have dropped from a tray a robot had been moving through the operating zone. Or, if the robot's force sensors detected instability in an output stack, a human worker may be tasked to check the stack and adjust trays in the stack as needed to increase stability.

Figure 14:
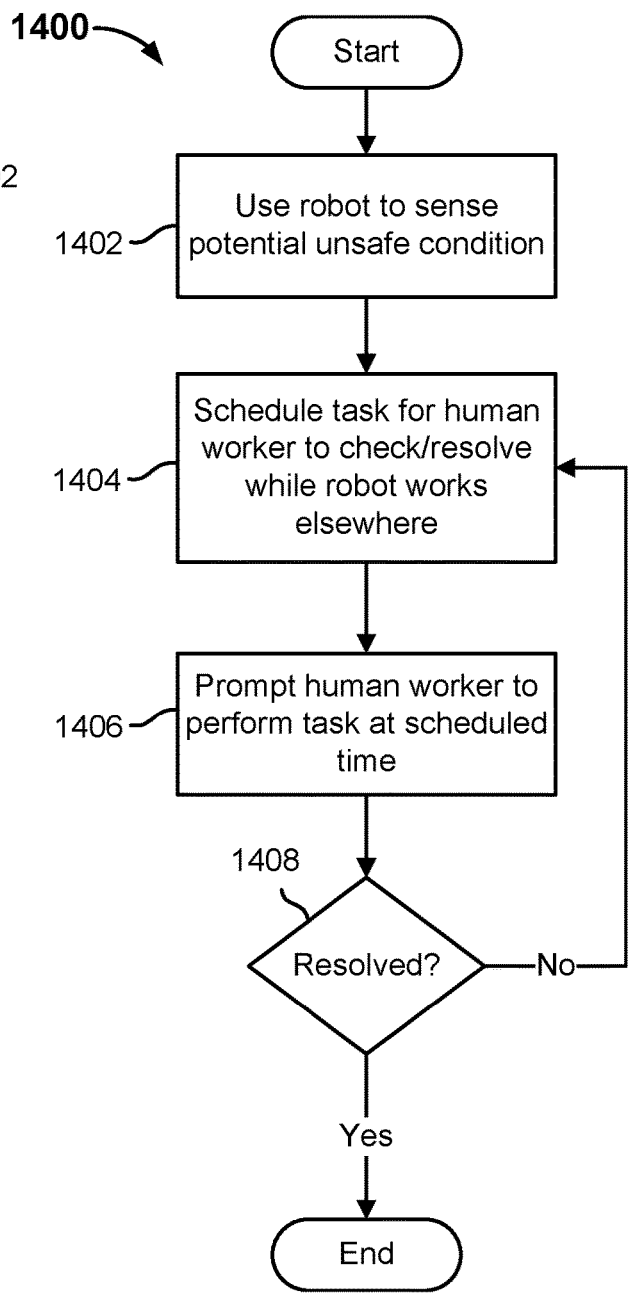
FIG. 14 is a flow diagram illustrating an embodiment of a process to schedule a task for a human worker to resolve a detected condition.

FIG. 14 is a flow diagram illustrating an embodiment of a process to schedule a task for a human worker to resolve a detected condition. In various embodiments, the process 1400 is performed by a computer, such as control computer 128 of FIG. 1A. In the example shown, at 1402 a robot's sensors are used to detect a potentially unsafe condition. For example, the robot's force sensors may be used to detect, based on a sensed change in weight, moments, etc., that an item may have dropped from a tray in the robot's grasp. Or, the system may be configured and/or may learn a profile or model of forces and moments associated with a stable stack and forces or moments that deviate from those associated with a stable stack may be detected. For example, trays may include recesses in the top of one more side walls and corresponding tabs on their bottom that fit into the recesses of a lower tray on which a tray is stacked. The system may learn or be programmed to perform a "slotting" operation that includes attempting to move a tray, e.g., forward and back and/or from side to side, upon placing a tray on the stack, to facilitate the tabs at the bottom of the tray being inserted into the corresponding recesses at the top of the tray on which it is being placed. If the sensed forces and/or moments are not consistent with successful slotting and/or are associated with instability in the stack, a potentially unsafe condition may be determined to have been detected.

At 1404, a task for a human work to assess and, if needed, address and resolve the condition detected at 1402 is scheduled. In the meantime, the system may continue to perform tasks robotically in the same operating area, and at the scheduled time may continue to perform tasks robotically in other operating zones, while the human task is being performed in the affected operating zone. At 1406, the human worker is prompted to perform the human task at the scheduled time. The human may receive a list of tasks to be performed and for each the scheduled time and/or the human worker may receive at the scheduled time a prompt or notification to perform the task. Once the condition has been resolved (1408), the process 1400 ends.

Figure 15A:
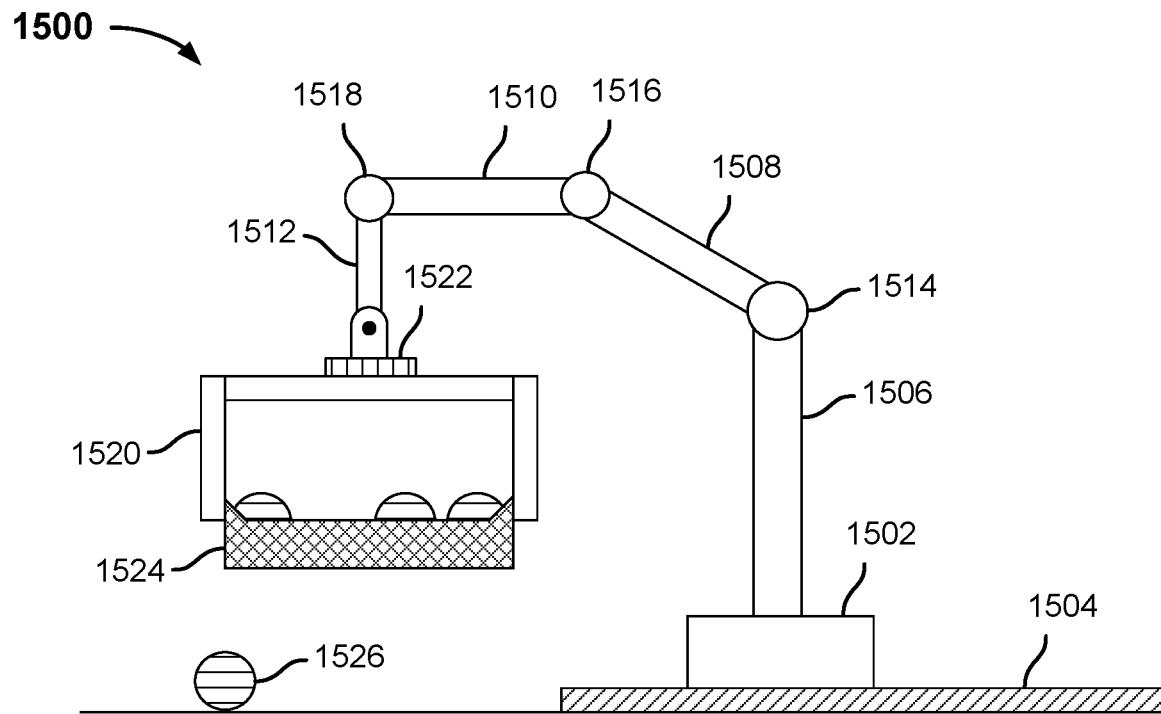
FIG. 15A is a diagram illustrating an embodiment of a robotic line kitting system configured to detect a condition and schedule a task for a human worker to resolve the condition.

FIG. 15A is a diagram illustrating an embodiment of a robotic line kitting system configured to detect a condition and schedule a task for a human worker to resolve the condition. In the example shown, the robotic system 1500 includes a chassis 1502 configured to move along a rail 1504 under robotic control. A robotic arm comprising segments 1506, 1508, 1510, and 1512 connected by motorized joints 1514, 1516, and 1518 is mounted on chassis 1502. An end effector 1520 is attached to free end segment 1512 via a coupling that includes a wrist 1522 that includes a force sensor array. In the example shown, end effector 1520 has been used to grasp a tray 1524 from which an item 1526 has fallen to the floor. In various embodiments, techniques disclosed herein, e.g., the process 1400 of FIG. 14, may be performed to detect based on readings from the force sensor array in wrist 1522 a weight change associated with an occurrence such as item 1526 being dropped. In various embodiments, detecting a condition as shown in FIG. 15A may result in the system scheduling a human worker to assess and correct the situation, e.g., as described above.

Figure 15B:
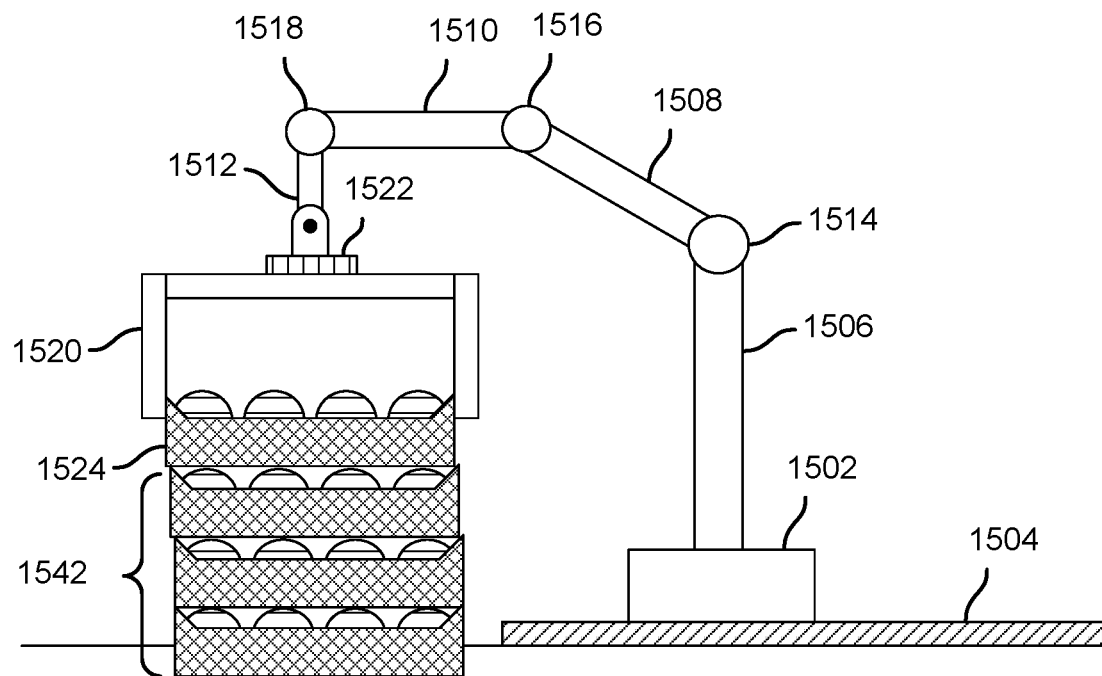
FIG. 15B is a diagram illustrating an embodiment of a robotic line kitting system configured to detect a condition and schedule a task for a human worker to resolve the condition.

FIG. 15B is a diagram illustrating an embodiment of a robotic line kitting system configured to detect a condition and schedule a task for a human worker to resolve the condition. In this example, the robotic arm of FIG. 15B is being used to place the tray 1524 on an output stack 1542. In various embodiments, readings from the force sensor array in wrist 1522 may be used, e.g., as described above, to detect incomplete slotting of the tray 1524 on stack 1542 or other instability in the stack 1542. In various embodiments, upon detecting instability in the stack 1542, the system may set the tray 1524 in a safe place, such as on the ground near stack 1542, and may schedule a future task for a human worker to assess and resolve the situation.

In various embodiments, techniques disclosed herein may be used to maximize robot utilization and productivity and protect human safety in environments in which robots and human workers may both be employed, such as in robotic line kitting systems as disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic line kitting system, comprising:
a memory configured to store data indicating, for each of a plurality of operating zones comprising a workspace with which the robotic line kitting system is associated, a corresponding state information indicating an extent to which that operating zone currently is or is not available to the robotic line kitting system to perform tasks using one or more robotic instrumentalities comprising the robotic line kitting system; and
a processor coupled to the memory and configured to:
use the data indicating, for each of the plurality of operating zones, the extent to which that operating zone currently is or is not available to the robotic line kitting system to perform tasks using the one or more robotic instrumentalities to dynamically schedule and perform tasks associated with a higher level objective, including by operating the one or more robotic instrumentalities in one or more operating zones, if any, indicated by said data to currently be available to perform tasks using the one or more robotic instrumentalities and by not operating the one or more robotic instrumentalities in one or more operating zones, if any, indicated by said data to not currently be available to perform tasks using the one or more robotic instrumentalities;
receive from a first sensor associated with a first operating zone of the plurality of operating zones, first operating zone state information associated with the first operating zone of the plurality of operating zones, wherein the first sensor is located at an entrance to the first operating zone;
receive from a second sensor associated with the first operating zone of the plurality of operating zones, second operating zone state information associated with the first operating zone, wherein the second sensor is located in the first operating zone at a distance offset from the first sensor;
in response to receiving the first operating zone state information associated with the first operating zone and the second operating zone state information associated with the first operating zone, update the corresponding state information associated with the first operating zone to indicate that the first operating zone is not available to the robotic line kitting system; and
in response to the corresponding state information associated with the first operating zone of the plurality of operating zones being updated to indicate that the first operating zone is not available to the robotic line kitting system, alter autonomous behavior of the one or more robotic instrumentalities to ensure safety of any human worker in the first operating zone, wherein the autonomous behavior of the one or more robotic instrumentalities is altered based on whether the first operating zone state information associated with the first operating zone indicates a presence of a human worker in the first operating zone and the second operating zone state information associated with the first operating zone does not indicate the presence of the human worker in the first operating zone or whether the first operating zone state information associated with the first operating zone and the second operating zone state information associated with the first operating zone indicates the presence of the human worker in the first operating zone.

2. The robotic line kitting system of claim 1, wherein the processor is further configured to store in said memory said data indicating for each of the plurality of operating zones the extent to which that operating zone currently is or is not available to the robotic line kitting system to perform tasks using the one or more robotic instrumentalities.

3. The robotic line kitting system of claim 2, wherein the processor is further configured to determine based on data received from one or more sensors said data indicating for each of the plurality of operating zones the extent to which that operating zone currently is or is not available to the robotic line kitting system to perform tasks using the one or more robotic instrumentalities.

4. The robotic line kitting system of claim 3, wherein the first sensor and the second sensor are configured to detect access by the human worker to one or more of said operating zones.

5. The robotic line kitting system of claim 3, wherein said one or more sensors includes data provided by a safety module comprising a first robotic instrumentality of the one or more robotic instrumentalities comprising the robotic line kitting system.

6. The system of claim 5, wherein the first robotic instrumentality comprises a robotic arm and the safety module provides as output data indicating for each of one or more operable elements comprising the robotic arm one or both of a position in three-dimensional space of the operable element and data indicating whether all or part of the operable element has entered or will enter a location associated with one or more of said operating zones.

7. The robotic line kitting system of claim 1, wherein the processor is further configured to cause a robotic instrumentality included in said one or more robotic instrumentalities to be operated in or adjacent to the first operating zone in a first mode associated with a first safety state of the first operating zone as indicated by a corresponding data included in said stored data.

8. The robotic line kitting system of claim 7, wherein the first safety state is associated with presence of a human worker in the first operating zone and the first mode comprises a pause stop mode in which the robotic instrumentality is brought to a stop in a controlled manner.

9. The robotic line kitting system of claim 7, wherein the first safety state is associated with presence of the human worker in the first operating zone and the first mode comprises a safe transit mode in which the robotic instrumentality is moved through or by the first operating zone at a reduced speed.

10. The robotic line kitting system of claim 9, wherein the safe transit mode further includes emitting an audible warning sound.

11. The robotic line kitting system of claim 9, wherein the safe transit mode further includes maintaining one or more operable elements of the robotic instrumentality in a stowed position.

12. The robotic line kitting system of claim 1, wherein the processor is further configured to detect a change in said state information for a given operating zone by which the operating zone has changed from being currently available to the robotic line kitting system to perform tasks using the one or more robotic instrumentalities comprising the robotic line kitting system to a state in which the given operating zone is not currently available to the robotic line kitting system to perform tasks using the one or more robotic instrumentalities.

13. The robotic line kitting system of claim 12, wherein the processor is further configured to determine a set of upcoming tasks scheduled to be performed at least in part in a region associated with the given operating zone and to revise a plan dynamically to cancel or modify the determined set of upcoming tasks to avoid operating in the given operating zone in a manner not permitted by a detected current state of the given operating zone.

14. The robotic line kitting system of claim 13, wherein the processor is configured to revise the plan in a manner that enables the robotic line kitting system to continue working in one or more operating zones other than the given operating zone.

15. A method to control a robotic line kitting system, comprising:
storing data indicating, for each of a plurality of operating zones comprising a workspace with which the robotic line kitting system is associated, a corresponding state information indicating an extent to which that operating zone currently is or is not available to the robotic line kitting system to perform tasks using one or more robotic instrumentalities comprising the robotic line kitting system;
using the data indicating, for each of the plurality of operating zones, the extent to which that operating zone currently is or is not available to the robotic line kitting system to perform tasks using the one or more robotic instrumentalities to dynamically schedule and perform tasks associated with a higher level objective, including by operating the one or more robotic instrumentalities in one or more operating zones, if any, indicated by said data to currently be available to perform tasks using the one or more robotic instrumentalities and by not operating the one or more robotic instrumentalities in one or more operating zones, if any, indicated by said data to not currently be available to perform tasks using the one or more robotic instrumentalities;
receiving from a first sensor associated with a first operating zone of the plurality of operating zones, first operating zone state information associated with the first operating zone of the plurality of operating zones, wherein the first sensor is located at an entrance to the first operating zone;
receiving from a second sensor associated with the first operating zone of the plurality of operating zones, second operating zone state information associated with the first operating zone, wherein the second sensor is located in the first operating zone at a distance offset from the first sensor;
in response to receiving the first operating zone state information associated with the first operating zone and the second operating zone state information associated with the first operating zone, updating the corresponding state information associated with the first operating zone to indicate that the first operating zone is not available to the robotic line kitting system; and
in response to the corresponding state information associated with the first operating zone of the plurality of operating zones being updated to indicate that the first operating zone is not available to the robotic line kitting system, altering autonomous behavior of the one or more robotic instrumentalities to ensure safety of any human worker in the first operating zone, wherein the autonomous behavior of the one or more robotic instrumentalities is altered based on whether the first operating zone state information associated with the first operating zone indicates a presence of a human worker in the first operating zone and the second operating zone state information associated with the first operating zone does not indicate the presence of the human worker in the first operating zone or whether the first operating zone state information associated with the first operating zone and the second operating zone state information associated with the first operating zone indicates the presence of the human worker in the first operating zone.

16. The method of claim 15, further comprising determining based on data received from one or more sensors said data indicating for each of the plurality of operating zones the extent to which that operating zone currently is or is not available to the robotic line kitting system to perform tasks using the one or more robotic instrumentalities.

17. The method of claim 16, wherein said one or more sensors include the first sensor configured to detect access by the human worker to one or more of said operating zones.

18. The method of claim 17, wherein said one or more sensors includes data provided by a safety module comprising a first robotic instrumentality of the one or more robotic instrumentalities comprising the robotic line kitting system.

19. The method of claim 18, wherein the first robotic instrumentality comprises a robotic arm and the safety module provides as output data indicating for each of one or more operable elements comprising the robotic arm one or both of a position in three-dimensional space of the operable element and data indicating whether all or part of the operable element has entered or will enter a location associated with one or more of said operating zones.

20. A computer program product to control a robotic line kitting system, the computer program product being embodied in a non-transitory computer readable medium and comprising computer instructions for:
storing data indicating, for each of a plurality of operating zones comprising a workspace with which the robotic line kitting system is associated, a corresponding state information indicating an extent to which that operating zone currently is or is not available to the robotic line kitting system to perform tasks using one or more robotic instrumentalities comprising the robotic line kitting system;
using the data indicating, for each of the plurality of operating zones, the extent to which that operating zone currently is or is not available to the robotic line kitting system to perform tasks using the one or more robotic instrumentalities to dynamically schedule and perform tasks associated with a higher level objective, including by operating the one or more robotic instrumentalities in one or more operating zones, if any, indicated by said data to currently be available to perform tasks using the one or more robotic instrumentalities and by not operating the one or more robotic instrumentalities in one or more operating zones, if any, indicated by said data to not currently be available to perform tasks using the one or more robotic instrumentalities;
receiving from a first sensor associated with a first operating zone of the plurality of operating zones, first operating zone state information associated with the first operating zone of the plurality of operating zones, wherein the first sensor is located at an entrance to the first operating zone;

receiving from a second sensor associated with the first operating zone of the plurality of operating zones, second operating zone state information associated with the first operating zone, wherein the second sensor is located in the first operating zone at a distance offset from the first sensor;

in response to receiving the first operating zone state information associated with the first operating zone and the second operating zone state information associated with the first operating zone, updating the corresponding state information associated with the first operating zone to indicate that the first operating zone is not available to the robotic line kitting system; and in response to the corresponding state information associated with the first operating zone of the plurality of operating zones being updated to indicate that the first operating zone is not available to the robotic line kitting system, altering autonomous behavior of the one or more robotic instrumentalities to ensure safety of any human worker in the first operating zone, wherein the autonomous behavior of the one or more robotic instrumentalities is altered based on whether the first operating zone state information associated with the first operating zone indicates a presence of a human worker in the first operating zone and the second operating zone state information associated with the first operating zone does not indicate the presence of the human worker in the first operating zone or whether the first operating zone state information associated with the first operating zone and the second operating zone state information associated with the first operating zone indicates the presence of the human worker in the first operating zone.

* * * * *